(12) United States Patent
Katagiri

(10) Patent No.: US 6,376,856 B1
(45) Date of Patent: Apr. 23, 2002

(54) APPARATUS FOR READING RADIATION IMAGE RECORDED IN AN IMAGING PLATE AND A METHOD FOR READING IT

(75) Inventor: Masaki Katagiri, Ibaraki-ken (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 09/398,092

(22) Filed: Sep. 17, 1999

(30) Foreign Application Priority Data

Sep. 22, 1998 (JP) .......................................... 10-267737
Nov. 9, 1998 (JP) .......................................... 10-317377

(51) Int. Cl.$^7$ .............................................. G02B 26/08
(52) U.S. Cl. ...................................... 250/584; 250/585
(58) Field of Search ................................. 250/584, 585, 250/586, 484.1, 582, 458.1, 363.02, 363.07, 363.08

(56) References Cited

U.S. PATENT DOCUMENTS

| | | | | |
|---|---|---|---|---|
| 5,059,795 A | * | 10/1991 | Izumi | 250/327.2 |
| 5,109,297 A | * | 4/1992 | Izumi | 359/216 |
| 5,266,803 A | * | 11/1993 | Heffelfinger | 250/582 |
| 5,864,146 A | * | 1/1999 | Karellas | 250/581 |

OTHER PUBLICATIONS

P. Ottonello et al. "Slow neutron imaging using scintillating glass optical fibers", Nuclear Instruments and Methods in Physics Research, A 349 (1994) pp. 526–531 North–Holland.

J. Miyahara, et al., A New Type of X–ray Area Detector Utilizing Laser Stimulated Luminescence, Nucl. Instr. and Meth in Physics Research A246 (1986) 572.

K. Hasegawa, et al., Imaging Plate Readout System, Nucl. Instr. and Meth A310 (1994) 521.

N. Niimura, et al., An Imaging Plate Neutron Detector, Nucl. Instr. and Meth A349 (1994) 521.

M. Thoms, et al., An Improved X–Ray Detector for Use at Synchortrons, Nucl. Instr and Meth A413 (1998) 175.

N. Miyanaga, et al., Fiber Scintillator/Streak Carmera Detector for Burn History Measurement in Inertial Confinement Fusion Experiment, Rev. Sci. Instrum. 68 (1), (1997) 621.

D.P. Hutchinson, et al., Neutron Scintillators Using Wavelength Shifting Fibers, J. Neutron Research, vol. 4 (1996) 123.

* cited by examiner

Primary Examiner—Constantine Hannaher
Assistant Examiner—Otilia Gabor
(74) Attorney, Agent, or Firm—Banner & Witcoff, Ltd.

(57) ABSTRACT

Method for reading a radiation image recorded two-dimensionally in an imaging plate using stimulable phospor as a radiation detecting medium. The image in the imaging plate is read rapidly and continuously as the plate is illuminated with radiation, and therefore is useful in understanding dynamic events based on rapid processing and real-time radiation image detection. Also, apparatus for carrying out the method.

23 Claims, 10 Drawing Sheets

APPARATUS FOR READING RADIATION IMAGE RECORDED IN AN IMAGING PLATE AND A METHOD FOR READING IT

BACKGROUND OF THE INVENTION

This invention relates to a method of reading the radiation image recorded two-dimensionally in an imaging plate that uses a stimulable phosphor as a radiation detecting medium. The invention relates particularly to a method characterized by rapid reading of the radiation image in the imaging plate and its continuous reading as the plate is illuminated with radiation. Because of these features, the invention is useful in understanding dynamic events based on rapid processing and real-time radiation image detection as in medical X-ray diagnosis, X-ray structural analysis and research, neutral structural analysis and research, and autoradiography using X-rays and neutrons.

FIG. 1 shows a conventional method of reading the radiation image recorded two-dimensionally in an imaging plate that uses a stimulable phosphor as a radiation detecting medium. An irradiated imaging plate 201 on a transport belt 202 is moved as it is scanned over the surface with a spot beam of exciting light 204 from a light source 203 that has been reflected by a galvano-mirror 205. The exciting light is typically laser light. The exciting light 204 generates photostimulated fluorescence 206 that is directed by a condensing guide 207 typically made of an optical fiber bundle and passed through a bandpass optical filter 208 having the wavelength of the photostimulated fluorescence as a center wavelength before it is detected with a photomultiplier tube 209. The detected light is then supplied to a signal processor 210, where it is converted to digital signals in accordance with intensity and reconstructed as a radiation image; this is the process of reading the radiation image recorded two-dimensionally in the imaging plate 201 [Nucl. Instr. and Meth., A246, p. 572–578 (1986); Gendai Kagaku, No. 223, p. 29–36 (1989)].

Another method currently used to transport the imaging plate is by rotating it on a drum [Nucl. Instr. and Meth., A310, p. 366–368 (1991); Hoshasen, Vol. 23, No. 2, p. 43–51 (1995)].

In the conventional method of reading radiation images, an imaging plate mounted on a belt or a drum is moved as its surface is scanned two-dimensionally pixel by pixel with a spot beam of laser light. Reading the radiation image from the entire surface of the imaging plate by this method is a time-consuming job. In addition, the imaging plate is moved mechanically in order to read one of the two axes in two-dimensional scanning and this not only limits the moving speed but also increases the chance of mechanical troubles. As a result, it has been difficult to perform real-time detection of the radiation image at high speed as the imaging plate is illuminated with radiation.

As a further problem, detecting the photostimulated fluorescence from the same side of the imaging plate as where the exciting light is incident makes the system highly sensitive to the intense scattering of the exciting light which can be background noise to the radiation image. In order to avoid the undesired effects of the scattered light, improvements have been made on the technique of processing the surface of the imaging plate and the method of condensing the photostimulated fluorescence by the condensing guide.

SUMMARY OF THE INVENTION

The principal object of the invention is to provide a method of reading the radiation image in an imaging plate that is capable of rapid reading of the radiation image with high sensitivity and reduced background noise from the scattering of exciting light, that minimizes the mechanically moving parts to reduce the causes of trouble, and that enables the radiation image to be read continuously in real time and stored as a digital image while the imaging plate is illuminated with radiation.

In order to attain this object, the exciting light for reading the photostimulated fluorescence from color centers created by radiation in the bulk of the stimulable phosphor used as a detecting medium in the imaging plate is applied in a rectangular shape to the front side of the imaging plate whereas the photostimulated fluorescence from the back side of the imaging plate is detected with a planar array of wavelength shifters that is positioned at right angles to the rectangular shape of exciting light, thereby reading the two-dimensionally recorded radiation image. This enables the radiation image to be read from the imaging plate at high speed since the whole image can be read by scanning with the moving rectangular shape of exciting light. As a further advantage, the imaging plate fixed on the scan table is scanned by illumination with the rectangular shape of exciting light and this reduces the causes of trouble since the only mechanical part of the system is found in the mechanism for performing one-directional scan.

The imaging plate used in the method of the invention which relies upon a stimulable phosphor as a detection medium is capable of transmitting light through both front and back sides and exciting light is incident on the front side whereas the photostimulated fluorescence emitted from the back side is detected. Therefore, almost all of the scattered exciting light that is emitted simultaneously with the photostimulated fluorescence is rejected by the bandpass optical filter that is placed behind the imaging plate and which has the wavelength of the photostimulated fluorescence as a center wavelength. Any leakage of the scattered exciting light from the optical filter is incident on the wavelength shifters in fiber form at right angles and only a very portion of it propagates through the shifters. The fluorescence shifted in wavelength by the wavelength shifters is passed through a bandpass optical filter having the wavelength of the fluorescence as a central wavelength and this ensures that the scattered exciting light will not be launched into a photodetector to become background noise to the radiation image.

The imaging plate used in the invention may be so modified as to comprise a planar array of fibers made of a transparent glass capable of emitting photostimulated fluorescence. Since this type of glass itself is in fiber form, the imaging plate allows for efficient reading of photostimulated fluorescence from the color centers created by radiation. The already described method of reading can be employed without any change and the radiation image in the imaging plate can be read at high speed and with high sensitivity by scanning with the moving rectangular shape of exciting light.

In the conventional method, a photomultiplier tube has been used as a photodetector. In the invention, a multi-channel photodetector is substituted that consists of optics, a streak tube and a CCD camera. The streak tube consists of a photocathode, electrodes with a slit, a deflector, a microplate channel and a fluorescent screen. The fluorescence emitted from the array of wavelength shifters is passed through the optics and allowed to be incident on the horizontal axis of the streak tube. Since the streak tube sweeps the deflector by time, its vertical axis is swept in correspondence with the reading position in the longitudinal direction of the imaging plate, whereby a streak image is produced on the fluorescent screen. The streak image is cumulatively detected with the CCD camera capable of two-dimensional recording and the accumulated signals are digitized with a signal processor, thereby reading the radiation image recorded two-dimensionally in the imaging plate. Using this multi-channel photodetector, one can detect photostimulated fluorescence, integrate the amount of fluorescence and store a large volume of data within very short times. On the other hand, if photomultiplier tubes are to be used, their number must be equal to that of the wavelength shifters used and the same numbers of signal amplifiers, integrators and analog/digital converters must also be used at subsequent stages; this raises the need to use a huge volume of modules but offers the advantage of enabling real-time processing. It should also be noted that the time required for the analog/digital converters to digitize signals is "dead time", which is a dominant factor in determining the scanning time.

The present inventors also developed a method of condensing and detecting photostimulated fluorescence via optical fibers as a means for effective use of the multi-channel photodetector composed of optics, a streak tube and a CCD camera. This method uses an imaging plate reading apparatus comprising an imaging plate using a stimulable phosphor as a detecting medium, an exciting light source that emits a wavelength of light capable of exciting the stimulable phosphor, a mechanism by which the exciting light outputted from the exciting light source is applied in a rectangular shape, a single array of optical fibers into which the rectangular shape of photostimulated fluorescence produced by illumination with the exciting light is launched from an end to be condensed, a scan mechanism in which both the mechanism for applying the exciting light in a rectangular shape and the optical fiber array are mounted on the moving section and which moves them simultaneously to scan the entire surface of the imaging plate, a bandpass optical filter having the wavelength of the photostimulated fluorescence as a central wavelength, a multi-channel photodetector for detecting in multiple channels the photostimulated fluorescence outputted from the optical fiber array and which consists of optics, a streak tube and a CCD camera in combination, and a signal processor for processing the detection signals from the multiple channels. In this apparatus, the photostimulated fluorescence condensed by the optical fiber array is passed through the bandpass optical filter having the wavelength of the photostimulated fluorescence as a central wavelength. The photostimulated fluorescence is then passed through the optics and allowed to be incident on the horizontal axis of the streak tube whereas the vertical axis of the streak tube which sweeps by time is swept in correspondence with the reading position in the longitudinal direction of the imaging plate, whereby a streak image is produced on the fluorescent screen of the streak tube. The streak image is cumulatively detected with the CCD camera and the accumulated signals are read, digitized and reconstructed as a radiation image with the signal processor, whereby the radiation image recorded two-dimensionally in the imaging plate can be read.

Thus, it has become possible to perform a rapid process comprising the steps of detecting radiation image signals from the imaging plate, accumulating them, converting them to digital signals, and storing the digital signals in the data storage unit in the signal processor. By synchronizing the step of scanning the rectangular shape of exciting light continuously and repeatedly over the imaging plate from the start to the end point in its longitudinal width with the process comprising the steps of detecting radiation image signals from the imaging plate, accumulating them, converting them to digital signals and storing the digital signals in the storage unit in the signal processor, the two-dimensional radiation image can be continuously read from the imaging plate as it is illuminated with radiation.

However, the use of the multi-channel photodetector composed of optics, a streak tube and a CCD camera has a difficulty in that the process of scanning with exciting light must be suspended until all data accumulated in the CCD camera is digitized and incorporated into the signal processor. To solve this problem, the streak image on the fluorescent screen of the streak tube is detected and accumulated in two or more CCD cameras that are selectively operated in synchronism with the scan of the imaging plate so that while one CCD camera is in the process of detection and accumulation, the radiation image data already accumulated in another CCD camera is read out. With this approach, there is no need to suspend the scanning operation while the accumulated radiation image data is being read out of the CCD cameras and two-dimensional radiation image can be read continuously from the imaging plate as it is illuminated with radiation.

To operate two or more CCD cameras selectively, they are mounted at equal angles on a rotating table and moved in synchronism with repeated scan of the imaging plate with the rectangular shape of exciting light until one CCD camera comes into registry with the streak image on the fluorescent screen of the streak tube. While this CCD camera is in the process of detection and accumulation, the radiation image data already accumulated in another CCD camera is read out. With this approach, there is no need to suspend the scanning operation while the accumulated radiation image data is being read out of the CCD cameras and two-dimensional radiation image can be read continuously from the imaging plate as it is illuminated with radiation.

In the foregoing description, the radiations to be measured are limited to ionizing radiations such as X-rays, γ-rays, β-rays, α-rays and particle rays that can be directly measured with the imaging plate, but these are not the sole examples of the invention. If at least one neutron converter selected from among Gd, $^6$Li and $^{10}$B which can convert neutrons to an ionizable radiation is mixed or combined with the radiation detecting stimulable phosphor in the imaging plate, the resulting imaging plate can be used to detect neutrons and hence is suitable for reading two-dimensional neutron images. By continuously scanning this imaging plate for neutron detection, two-dimensional neutron images can be continuously read from the imaging plate as it is illuminated with neutrons.

BRIEF DESCRIPTION OF THE DRAWINGS

In FIG. 1, 203 in an exciting light source, 204 in an exciting light, 205 is a galvano mirror, 206 in a photostimulated fluorescence, 207 is a light condensing guide, 209 is a photomultiplier tube, 201 is an imaging plate, 202 is a transport belt, 208 is a optical filter, and 210 is a signal processor.

Figure 1:
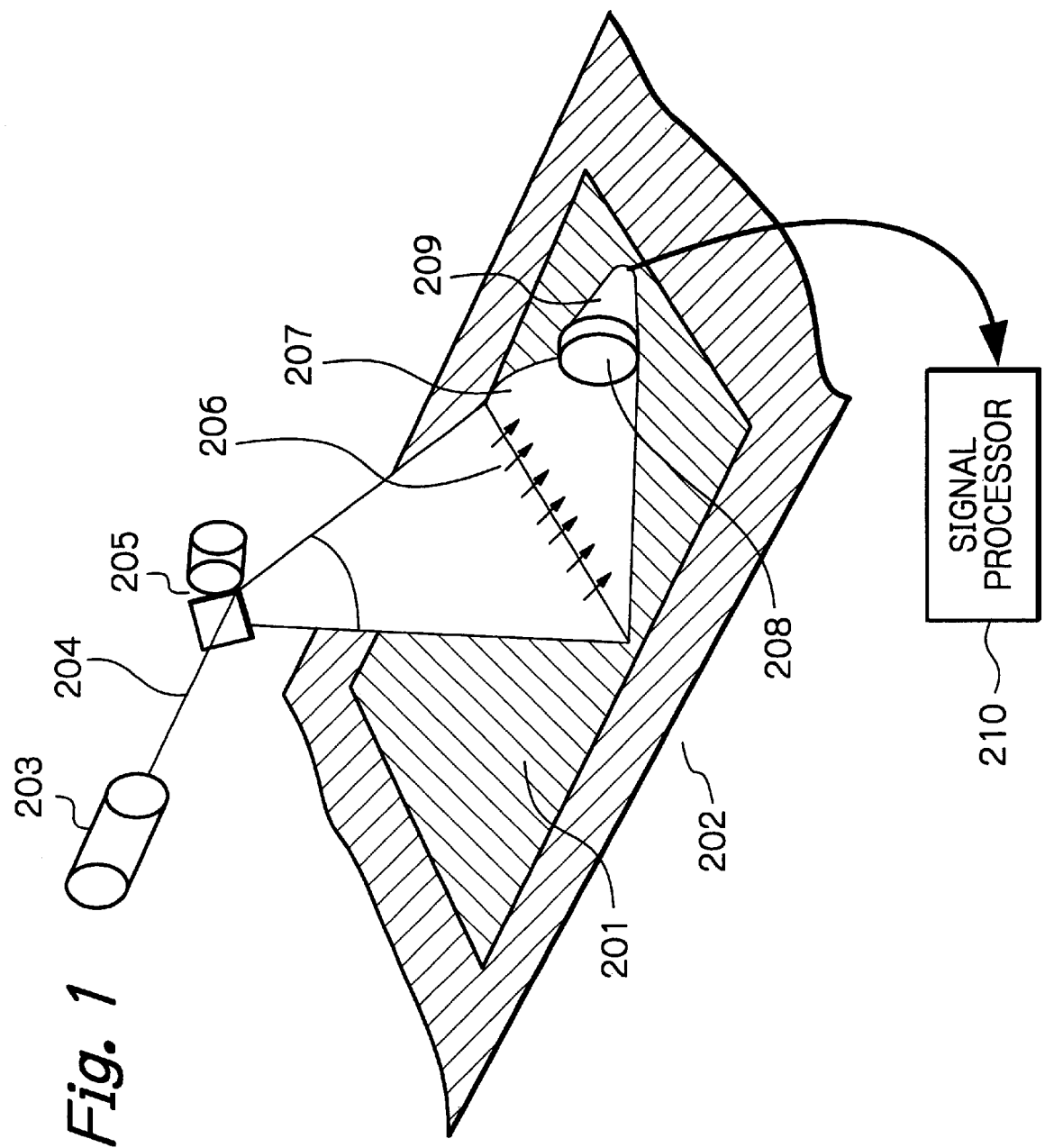
FIG. 1 shows an example of the conventional method of reading two-dimensional radiation images from an imaging plate.
Figure 2:
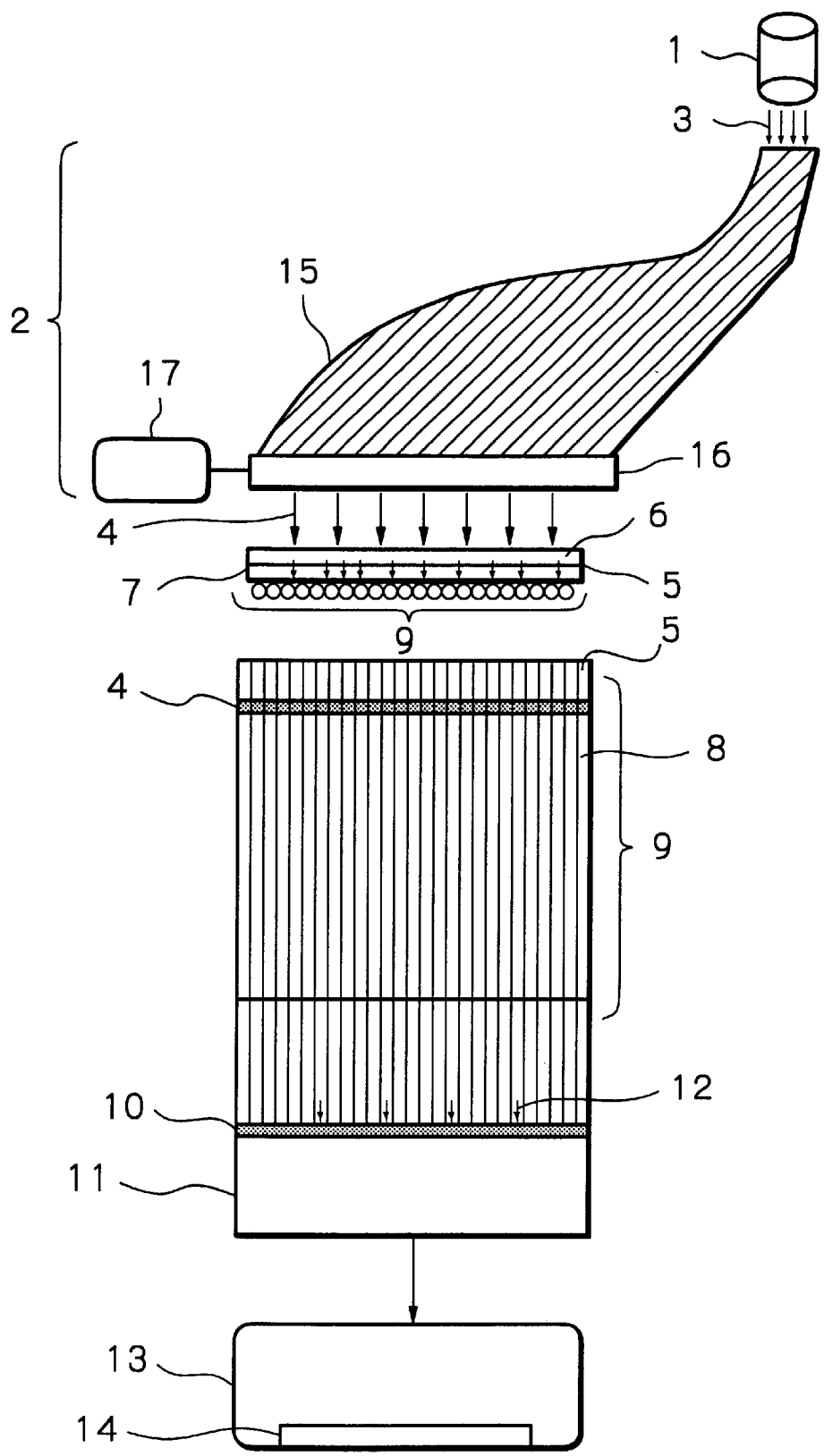
FIG. 2 shows an exemplary method of reading two-dimensional radiation images from an imaging plate according to the invention.

In a FIG. 2, 1 is an exciting light source, 3 is an exciting light, 2 is an illumination and scan mechanism, 15 is an optical fiber array for guiding the exciting light, 17 is a fine adjusting mechanism, 16 is a mirror, 4 is an exciting light in rectangular shape, 6 is a photostimulated fluorescence, 7 is an optical filter, 5 is an imaging plate, 9 is a fluorescent plastic optical fiber array, 4 is an exciting light in rectangular shape, 8 is a fluorescent plastic optical fiber, 9 is a fluorescent plastic optical fiber array, 12 is a wavelength-shifted fluorescence, 10 is an optical filter, 11 is a multi-channel photodetector, 13 is a signal processor, 14 is a storage unit.

Figure 3:
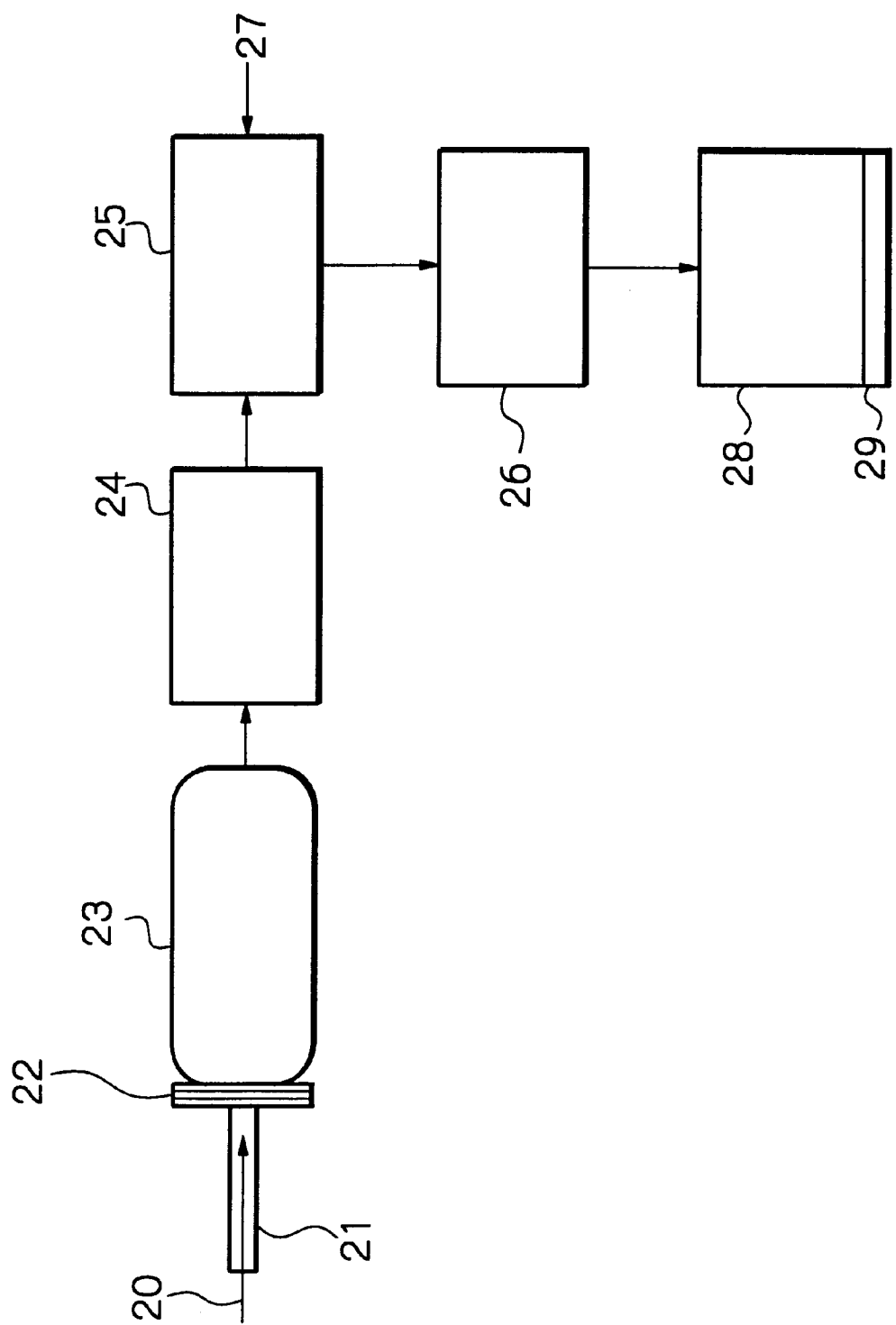
FIG. 3 shows an example of the conventional system of detecting photostimulated fluorescence using a photomultiplier tube.

In FIG. 3, 20 is a wavelength-shifted fluorescence, 22 is an optical filter, 23 is a photomultiplier tube, 24 is a signal amplifier, 25 is an integrator, 27 is a reset signal, 21 is a fluorescent plastic optical fiber, 26 is an analog/digital converter, 28 is a signal processor, 29 is a storage unit.

Figure 4:
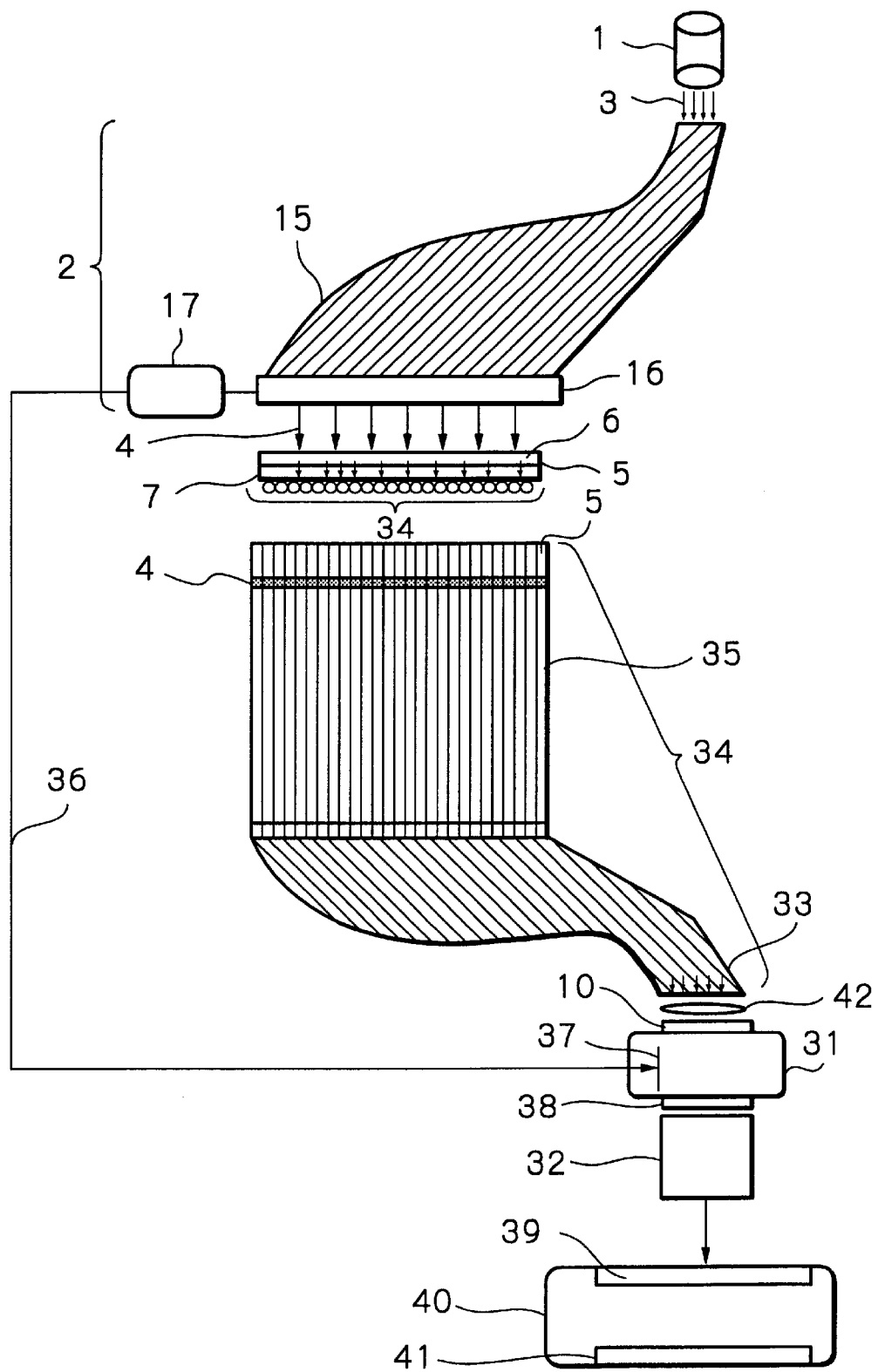
FIG. 4 shows an exemplary method of reading two-dimensional radiation images using wavelength shifters and a multi-channel photodetector comprising optics, a streak tube and a CCD camera.

In FIG. 4, 1 is an exciting light source, 3 is an exciting light, 2 is a illumination and scan mechanism, 15 is an optical fiber array for guiding the exciting light, 17 is a fine adjusting mechanism, 4 is an exciting light in rectangular shape, 16 is a mirror, 6 is a photostimulated fluorescence, 7 is an optical filter, 5 is an imaging plate, 34 is a fluorescent plastic optical fiber array, 4 is an exciting light in rectangular shape, 35 is a fluorescent plastic optical fiber, 34 is a fluorescent plastic optical fiber array, 36 is a sweep signal, 33 is a wavelength-shifted fluorescence, 42 is an optics, 10 is an optical filter, 31 is a streak tube, 37 is a deflector, 38 is a fluorescent screen, 32 is a CCD camera, 39 is a frame memory, 40 is a signal processor, 41 is a storage unit.

Figure 5:
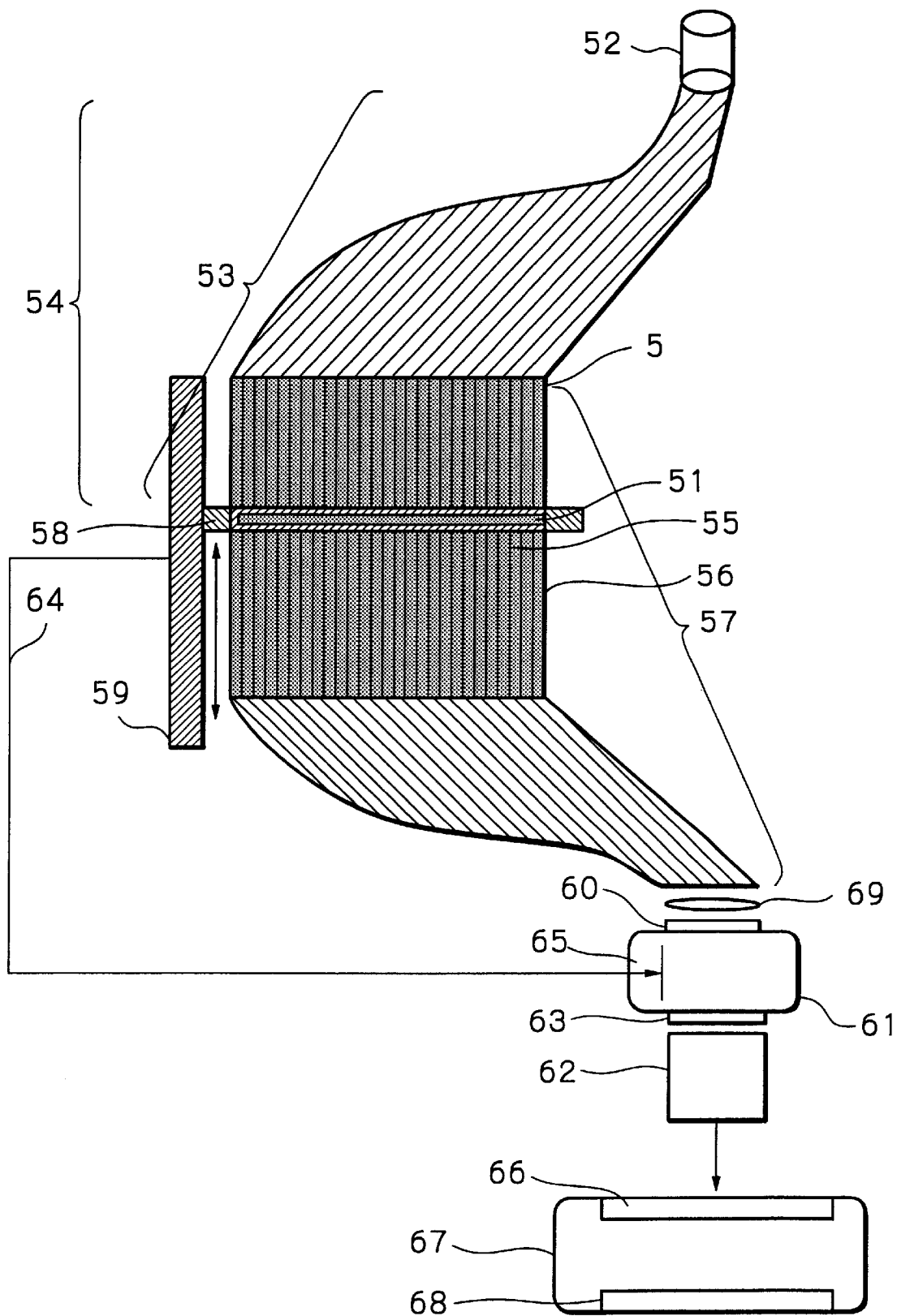
FIG. 5 shows an exemplary method of reading two-dimensional radiation images using optical fibers and a multi-channel photodetector comprising optics, a streak tube and a CCD camera.

In FIG. 5, 52 is an exciting light source, 54 is an illumination mechanism, 53 is an optical fiber array for guiding the exciting light, 5 is an imaging plate, 51 is an exciting light in rectangular shape, 55 is a photostimulated fluorescence, 58 is a moving section, 56 is a photostimulated fluorescence detecting optical fiber, 57 is a photostimulated fluorescence detecting optical fiber array, 64 is a sweep signal, 59 is a scan mechanism, 69 is an optics, 60 is an optical filter, 65 is an deflector, 63 is a fluorescent screen, 61 is a streak tube, 62 is a CCD camera, 66 is a frame memory, 67 is a signal processor, 68 is a storage unit.

Figure 6:
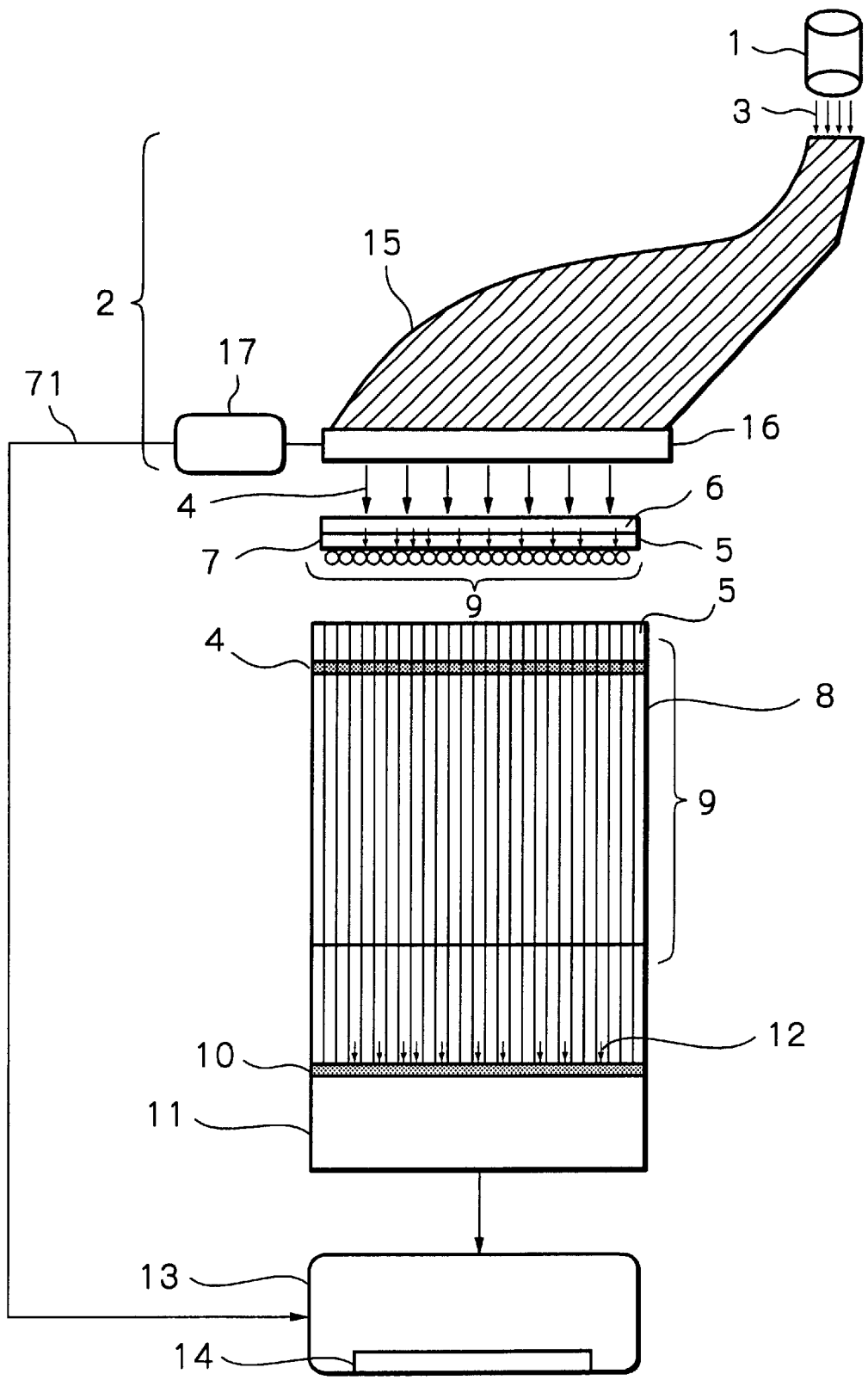
FIG. 6 shows an exemplary method of continuously reading two-dimensional radiation images from an imaging plate as it is illuminated with a radiation.

In FIG. 6, 1 is an exciting light source, 3 is an exciting light, 2 is an illumination and scan mechanism, 15 is an optical fiber array for guiding the exciting light, 17 is a fine adjusting mechanism, 71 is a sync signal, 16 is a mirror, 4 is an exciting light in rectangular shape, 6 is a photostimulated fluorescence, 7 is an optical filter, 5 is an imaging plate, 9 is a fluorescent plastic optical fiber array, 4 is an exciting light in rectangular shape, 8 is a fluorescent plastic optical fiber, 9 is a fluorescent plastic optical fiber array, 10 is an optical filter, 12 is a wavelength-shifted fluorescence, 11 is a multi-channel photodetector, 13 is a signal processor, 14 is a storage unit.

Figure 7:
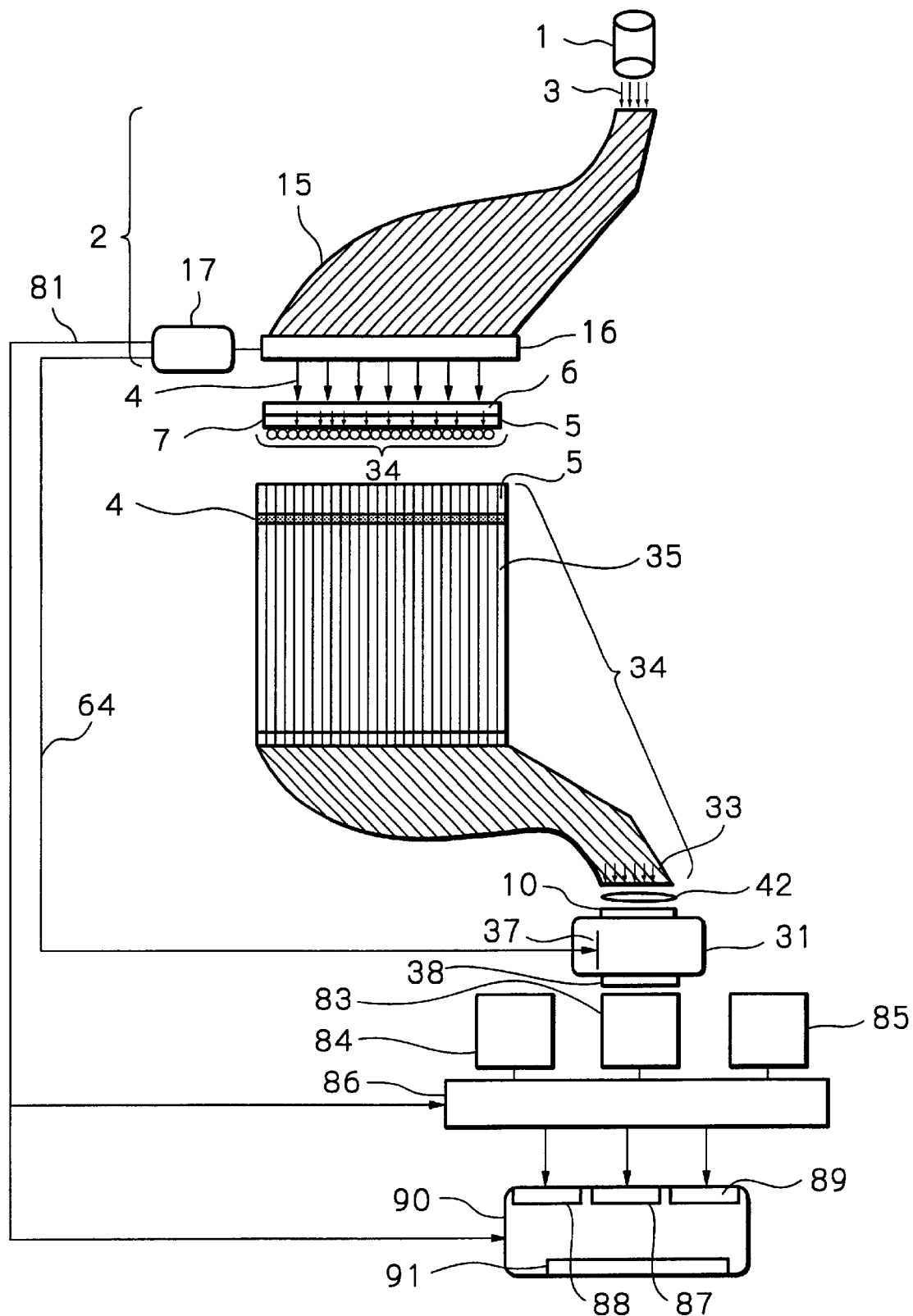
FIG. 7 shows an exemplary method of continuously reading two-dimensional radiation images from an imaging plate using two or more CCD cameras as the plate is illuminated with a radiation.

In FIG. 7, 1 is an exciting light source, 3 is an exciting light, 2 is an illumination and scan mechanism, 15 is an optical fiber array for guiding the exciting light, 17 is a fine adjusting mechanism, 81 is a sync signal, 16 is a mirror, 4 is an exciting light in rectangular shape, 6 is a photostimulated fluorescence, 7 is an optical filter, 5 is an imaging plate, 34 is a fluorescent plastic optical fiber array, 4 is an exciting light in rectangular shape, 35 is a fluorescent plastic optical fiber, 34 is a fluorescent plastic optical fiber array, 64 is a sweep signal, 33 is a wavelength-shifted fluorescence, 10 is an optical filter, 42 is a optics, 31 is a streak tube, 37 is a deflector, 38 is a fluorescent screen, 83, 84, 85 are CCD camera, 86 is a CCD camera switching mechanism, 87, 88, 89 are frame memory, 90 is a signal processor, 91 is a storage unit.

Figure 8:
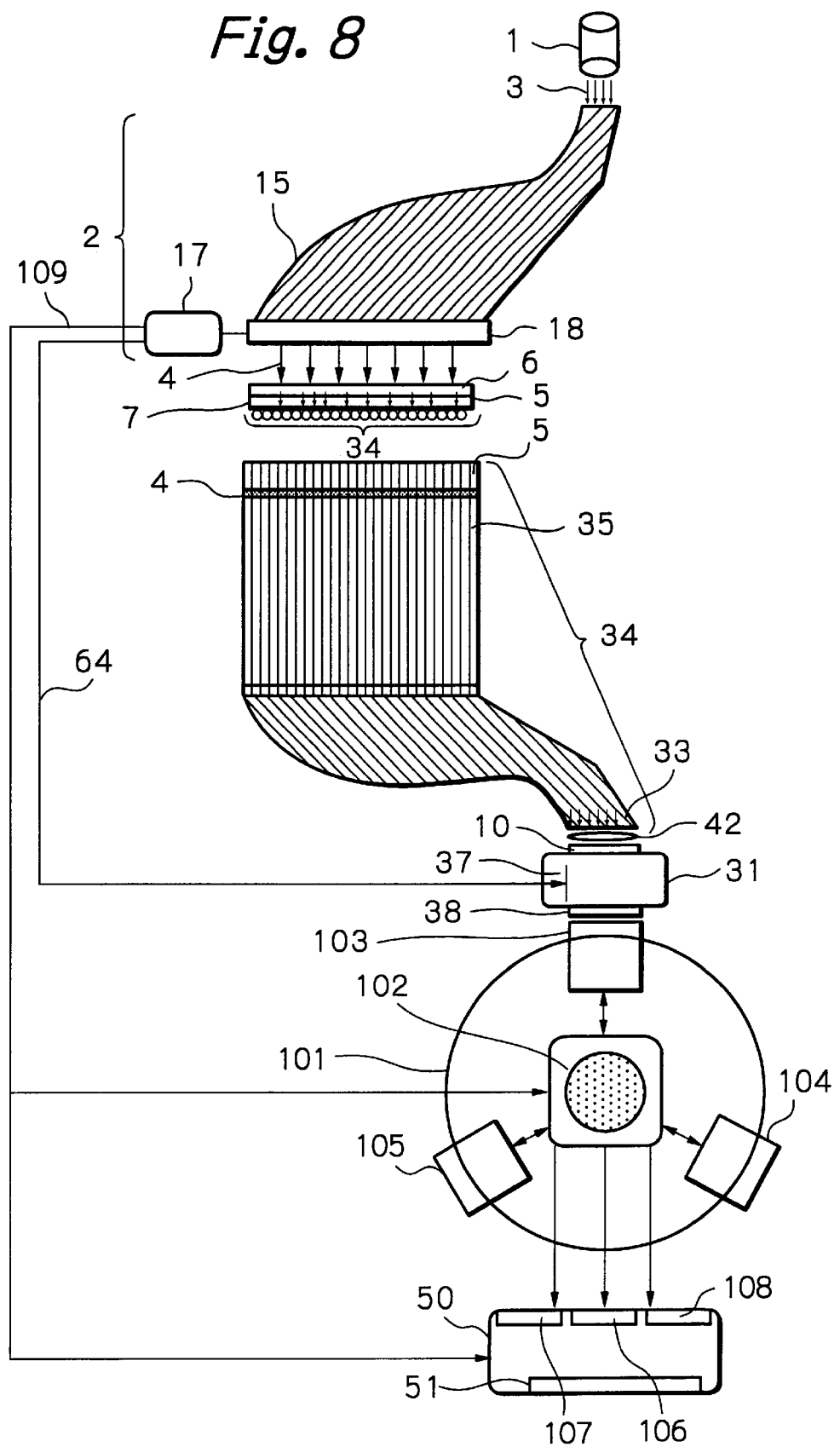
FIG. 8 shows an exemplary method of continuously reading two-dimensional radiation images from an imaging plate with two or more CCD cameras mounted on a rotating table as the plate is illuminated with a radiation.

In FIG. 8, 1 is an exciting light source, 3 is an exciting light, 2 is an illumination and scan mechanism, 15 is an optical fiber array for guiding the exciting light, 17 is a fine adjusting mechanism, 109 is a sync signal, 16 is a mirror, 4 is an exciting light in rectangular shape, 5 is an imaging plate, 34 is an fluorescent plastic optical fiber array, 35 is a fluorescent plastic optical fiber, 34 is a fluorescent plastic optical fiber array, 64 is a sweep signal, 33 is a wavelength-shifted fluorescence, 10 is an optical filter, 42 is an optics, 37 is an deflector, 31 is a streak tube, 38 is a fluorescent screen, 103, 104, 105 are CCD camera, 102 is a rotating table drive mechanism, 101 is a rotating table, 106, 107, 108 are frame memory, 51 is a storage unit, 50 is a signal processor.

Figure 9:
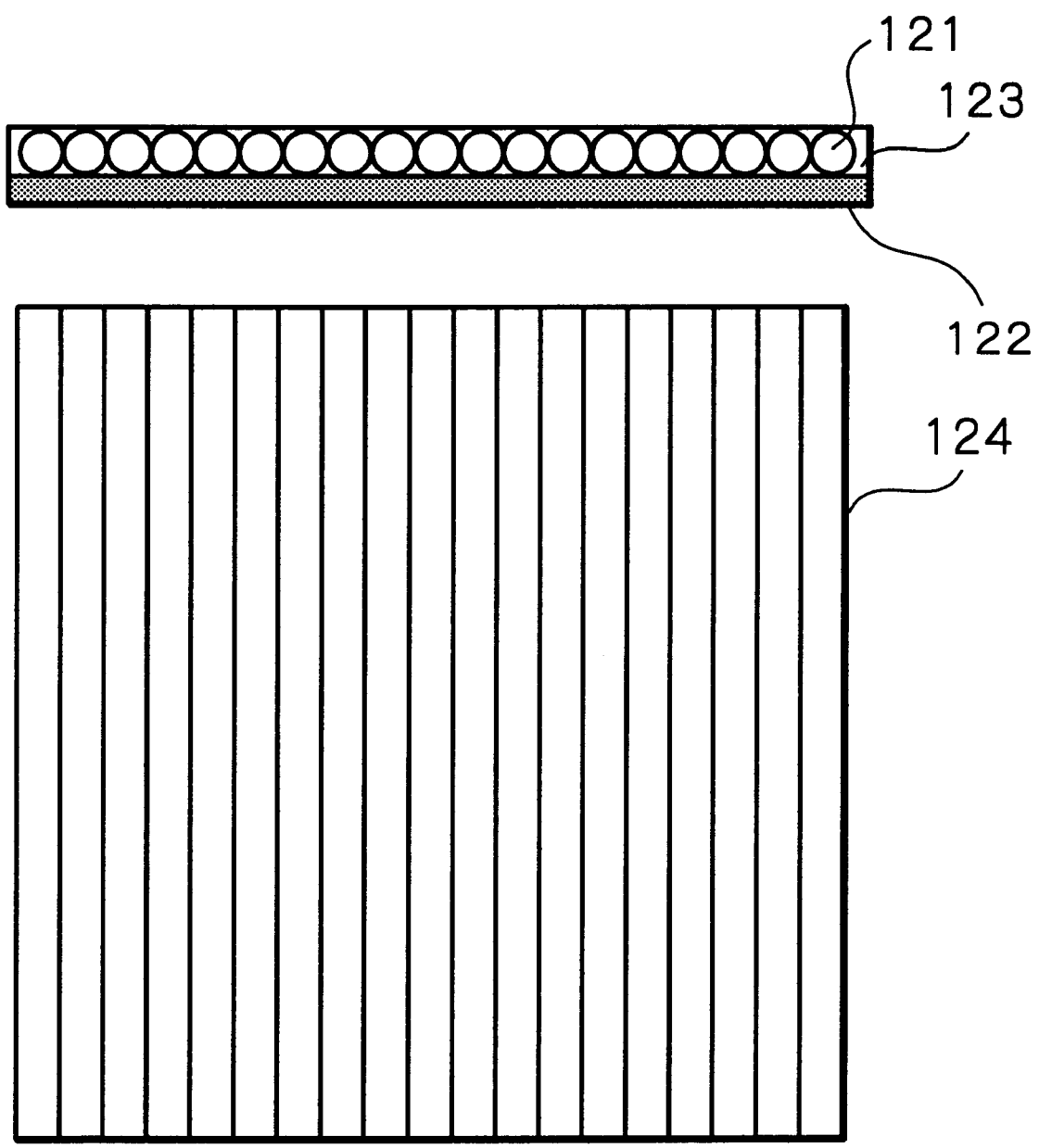
FIG. 9 shows an exemplary imaging plate using optical fibers made of a glass capable of emitting photostimulated fluorescence.

In FIG. 9, 121 is an optical fiber made of a photostimulated fluorescence emitting glass, 123 is an adhesive, 122 is a plastic base sheet, 124 is an imaging plate made of a photostimulated fluorescence emitting glass.

Figure 10:
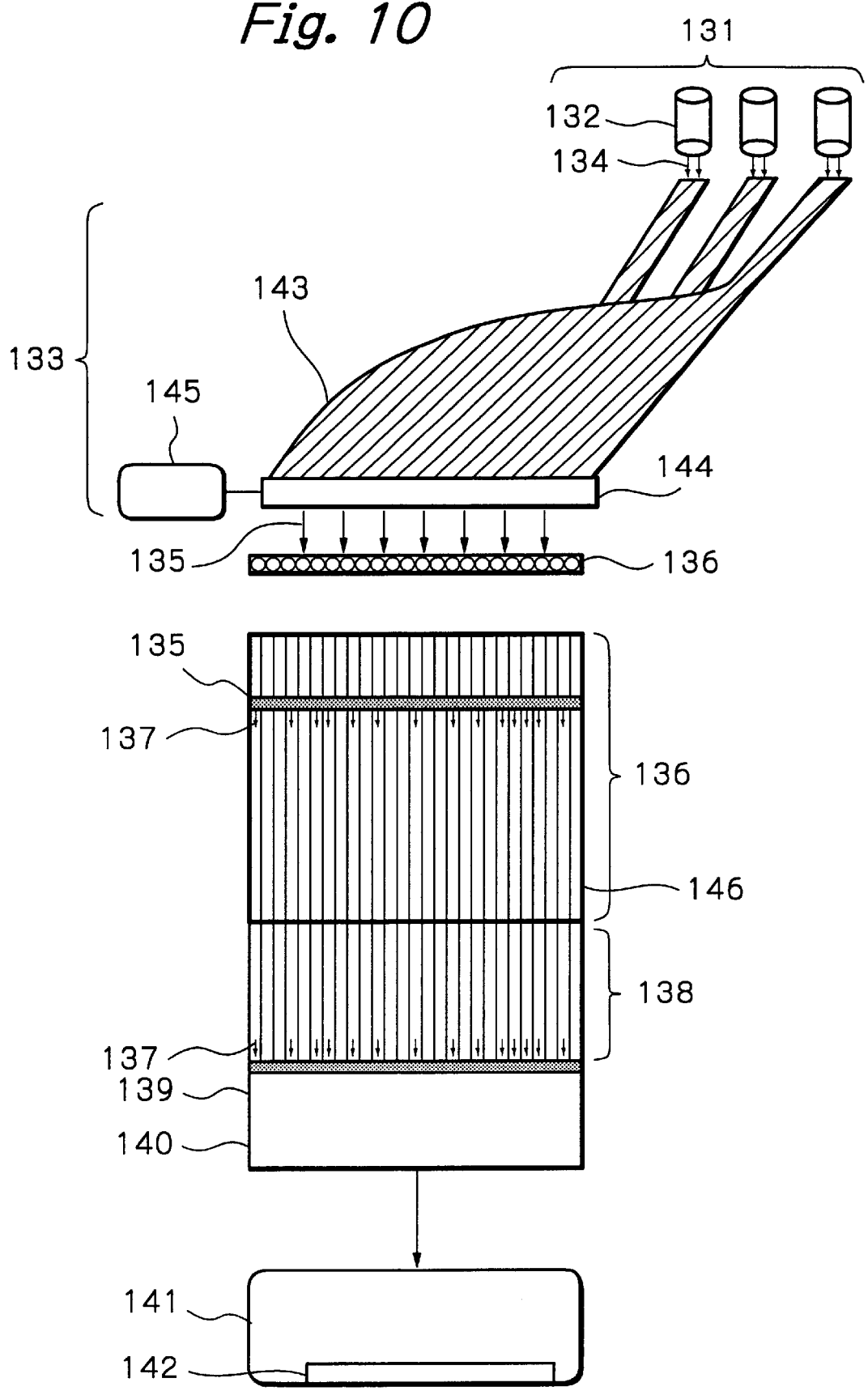
FIG. 10 shows an exemplary method of reading two-dimensional radiation images from an imaging plate using optical fibers made of a glass capable of emitting photostimulated fluorescence.

In FIG. 10, 131 is an exciting light source, 132 is a semiconductor laser, 134 is an exciting light, 133 is an illumination and scan mechanism, 143 is an optical fiber array for guiding the exciting light, 145 is a fine adjusting mechanism, 144 is a mirror, 136 is an imaging plate made of a photostimulated fluorescence emitting glass, 135 is an exciting light in rectangular shape, 137 is a photostimulated fluorescence, 146 is a fiber made of a photostimulated fluorescence emitting glass, 138 is a glass optical fiber, 139 is an optical filter, 140 is a multi-channel photodetector, 141 is a signal processor, 142 is a storage unit.

DETAILED DESCRIPTION OF THE INVENTION

Exciting light is applied in a rectangular shape to the front side of an imaging plate whereas the photostimulated fluorescence emitted in a rectangular shape from the back side of the imaging plate is detected with a planar array of fluorescence-excitable wavelength shifters in fiber form that is positioned at right angles to the rectangular shape of exciting light, thereby enabling the reading of the two-dimensionally recorded radiation image. This allows the radiation image to be read from the imaging plate at high speed by scanning the moving rectangular shape of exciting light across the imaging plate.

A planar array of optical fibers made of a glass capable of emitting photostimulated fluorescence may be provided in the imaging plate. Since the stimulable phosphor itself is in the form of an optical fiber, the photostimulated fluorescence from the color centers created by exposure to radiation can be efficiently read.

In another embodiment of the invention, a multi-channel photodetector is used that consists of optics, a streak tube and a CCD camera. The fluorescence that has been wavelength shifted by a planar array of wavelength shifters is passed through the optical filter and the optics and allowed to be incident on the horizontal axis of the streak tube whereas the vertical axis of the streak tube that sweeps by time is swept in correspondence with the reading position in the longitudinal direction of the imaging plate. The streak image produced on the fluorescent screen of the streak tube is cumulatively detected with the CCD camera capable of two-dimensional recording and the accumulated signals are read and digitized with a signal processor to thereby read the radiation image recorded two-dimensionally in the imaging plate.

In the same embodiment which uses a multi-channel photodetector comprising optics, a streak tube and a CCD camera, the rectangular shape of photostimulated fluorescence produced upon illumination with exciting light is launched into an end of a parallel array of optical fibers and condensed whereas the fluorescence outputted from the other end of the optical fiber array is launched into the horizontal axis of the streak tube while its vertical axis is swept in correspondence with the reading position in the longitudinal direction of the imaging plate. The streak image obtained by this procedure is cumulatively detected with the CCD camera and the accumulated signals are read and digitized with the signal processor, thereby reading the radiation image recorded two-dimensionally in the imaging plate.

If two or more CCD cameras are mounted on a rotating table or other suitable support and the streak image on the fluorescent screen of the streak tube is detected and accumulated in those CCD cameras which are moved and selectively operated in synchronism with the scan of the imaging plate, there is no need to suspend the scanning operation when the accumulated radiation image data is being read out of the CCD cameras and two-dimensional radiation image can be read continuously from the imaging plate as it is illuminated with radiation.

The above-described effect of the invention can be utilized in reading neutron images if the imaging plate is modified to be sensitive to neutrons.

EXAMPLE 1

We now describe the method of reading radiation images from an imaging plate according to an example of the invention with reference to FIG. 2. In FIG. 2, reference numeral 1 designates an exciting light source generating a wavelength of light that is capable of exciting a stimulable phosphor, 2 is an illumination and scan mechanism by which the exciting light 3 outputted from the source 1 is applied in a rectangular shape in the signal reading position on an imaging plate, 4 is the rectangular shape of exciting light, 5 is the imaging plate that is adapted to transmit light through both the front and back sides and which uses a stimulable phosphor as a detection medium, 6 is photostimulated fluorescence, 7 is a bandpass optical filter having the wavelength of the photostimulated fluorescence as a center wavelength, 8 is a wavelength shifter in fiber form that can be excited by photostimulated fluorescence, 9 is a planar array of such wavelength shifters, 10 is a bandpass optical filter which uses as a center wavelength the wavelength of fluorescence that has been shifted in wavelength by the wavelength shifters, 11 is a photodetector with which the fluorescence 12 emerging from the optical filter 10 after wavelength shift by the respective wavelength shifters can be detected through multiple channels, 13 is a signal processor with which the detection signals for the multiple channels are processed, digitized and reconstructed as a radiation image, and 14 is a storage unit for storing the reconstructed radiation image. The illumination and scan mechanism 2 is composed of an optical fiber array 15 for guiding the exciting light from the source 1, a mirror 16 and a mechanism 17 for fine adjustment of the mirror.

In this example, the imaging plate 5 from which radiation images are read by the method of the invention is a commercial product of BAS series manufactured by Fuji Photo Film Co., Ltd. The back side of the commercial imaging plate is not transparent but can be easily rendered transparent. The imaging plate 5 uses $BaFBr:Eu^{2+}$ as a stimulable phosphor. This stimulable phosphor can be excited over a wavelength band of 490 nm to 680 nm (where at least one half of the maximum efficiency is exhibited). The photostimulated fluorescence emitted upon illumination with the exciting light 3 has a wavelength of 390 nm.

While the following description of Example 1 is directed to $BaFBr:Eu^{2+}$, it should be noted that other stimulable phosphors such as $KCl:Eu^{2+}$, RbBr:Tl, SrS:Eu and Sm may be used as the detection medium and that imaging plates using them can also be processed to allow for the reading of radiation images by changing the conditions.

If the exciting light is used as a heat source, the method of the invention is also applicable to the purpose of reading two-dimensional radiation images from a plate using a thermofluorescent phosphor as a radiation detecting medium.

The method of the invention for reading radiation images from the imaging plate 5 is characterized in that when photostimulated fluorescence 6 that is emitted upon illumination with exciting light 3 of the color centers created in the bulk of the stimulable phosphor (i.e., the detection medium in the imaging plate 5) upon exposure to radiation are read as radiation signals, the exciting light is applied in the rectangular shape 4 one side of which is equal to or longer than the transverse width of the imaging plate 5 and the other side of which is comparable in length to the reading positional resolution in the longitudinal direction of the imaging plate 5.

The exciting light 3 is produced by the source 1 which is a laser in this example. Compared to the conventional pixel-by-pixel reading, the power of the laser which is required to produce a rectangular shape of exciting light has to be increased in accordance with the number of pixels that are read at a time. Considering reading within a short time, at least 5 W is required if 400 pixels are to be read at a time. The wavelength of the exciting light should be capable of exciting the photostimulated fluorescence 6 from the stimulable phosphor which is used as the detection medium in the imaging plate 5. The imaging plate of BAS series manufactured by Fuji Photo Film Co., Ltd. which is processed by the method of the invention to read radiation images uses $BaFBr:Eu^{2+}$ as the stimulable phosphor, so the wavelength band over which it can be excited ranges from 490 nm to 680 nm. An example of lasers that have an emission wavelength in this range and which are easy to produce high power is a semiconductor laser excited green laser (532 nm).

We next describe the illumination and scan mechanism 2 which uses the exciting light source 1 to produce the rectangular shape of exciting light 4 and applies it to the imaging plate 5. To produce the rectangular shape of exciting light 4, the exciting light 3 from the light source 1 is launched into the optical fiber array 15 having a circular input end and a rectangular output end. If the power of the exiting light is insufficient, the optical fiber array may be split into two or more groups and an exciting light source is used for each group to produce more powerful exciting light. Alternatively, the rectangular shape of exciting light may be produced by optics comprising the combination of lenses and mirrors.

Other methods that can be employed include the making of a rectangular source of exciting light using a parallel array of multiple semiconductor lasers or LEDs of superhigh brightness which individually have small power but in combination can directly produce a rectangular shape of exciting light, as well as combining these light sources with a rectangular array of optical fibers. If semiconductor lasers are to be used, one emitting at 635 nm near 632 nm which is the wavelength of the He-Ne laser that is commonly used as the source of exciting light for reading the imaging plate of BAS series manufactured by Fuji Photo Film Co., Ltd. is considered to be optimal. If the rectangular source of exciting light is to be used, it is fixed and the imaging plate is scanned by direct exposure to the exciting light as it is moved. This method is slow in scan speed but convenient to use.

The size of the rectangle of exciting light is largely dependent on the size of the imaging plate 5 to be scanned and the required positional resolution. In Example 1, the imaging plate 5 to be scanned measures 20 cm×20 cm and the positional resolution is 0.5 mm. The rectangle of exciting light 4 required in this case measures 20 cm×0.5 mm.

The created rectangular shape of exciting light 4 is applied to the front side of the imaging plate 5. For scanning the imaging plate 5, the planar mirror 16 is controlled with the fine adjusting mechanism 17 so that the rectangular shape of exciting light 4 is moved along the length of the imaging plate 5 by a specified width at either a constant speed or suitable intervals. The scan speed is dependent on the time required for the photostimulated fluorescence 6 to be substantially read from the pixels of interest by the exciting light 3. The reading time in turn is dependent on the size of a pixel, namely the positional resolution, and the intensity of the exciting light 3. If a commercial imaging plate is illuminated with exciting light of 12.5 mW for each pixel of 0.5 mm×0.5 mm, the required reading time is about 50 $\mu$s. Assuming constant or uniform scan, the scan speed is as fast as 10 m/s. At this scan speed, the time required to detect a radiation image by scanning the entire surface of the imaging plate 5 is very short and only 20 ms. Since the photostimulated fluorescence from the BaFBr:Eu$^{2+}$ used as the stimulable phosphor has a very short lifetime of 0.8 $\mu$s, the reading time can theoretically be shortened to about 1 $\mu$s. Therefore, by taking suitable action such as enhancing the power of the exciting light source 1, the above-mentioned time that is required to detect the radiation image by scanning the entire surface of the imaging plate can be reduced by a factor of at least one.

Instead of fine adjustment of the mirror 16, a polygonal mirror may be used as a means of scanning the rectangular shape of exciting light at high speed. Using a polygonal mirror, the scan speed can be increased by a factor of at least one.

The photostimulated fluorescence 6 emitted from the back side of the imaging plate 5 is passed through the bandpass optical filter 10 that is positioned behind the imaging plate 5 and which uses the wavelength of the photostimulated fluorescence as a center wavelength, whereby the scattered component of the exciting light 3 is rejected. In the case of Example 1, the wavelength of the photostimulated fluorescence 6 is 390 nm, so the optical filter 10 should have a center wavelength of 390 nm.

In the present invention, the wavelength shifters 8 are used to detect the photostimulated fluorescence 6. The criterion for selecting the wavelength shifters 8 is that the wavelength of the fluorescence 12 that has been subjected to wavelength shift is sufficiently different from the wavelength of the exciting light 3 to permit effective separation by the optical filter 10. The lifetime of the wavelength-shifted fluorescence 12 affects the positional resolution in the longitudinal direction of the imaging plate 5 and the scan speed and, hence, it is desirably equal to or shorter than the lifetime of the photostimulated fluorescence 6. In Example 1 where the photostimulated fluorescence 6 has a wavelength of 390 nm, the wavelength shifters 8 are made of fluorescent plastic fibers that have such wavelength shifting performance that the exciting wavelength band is from 320 nm to 395 nm with a center fluorescent wavelength of 450 nm. The wavelength shifted fluorescence 12 has a lifetime of 0.1 $\mu$s or shorter. The individual fibers have a diameter of 0.5 mm to provide a width equivalent to the reading positional resolution in the transverse direction of the imaging plate 5 and their length is 50 cm since the longitudinal width of the imaging plate 5 is 20 cm and considering the distance to the photodetector. In order to ensure a detection area having a length of 20 cm which is equivalent to the transverse width of the imaging plate 5, as many as 400 fluorescent plastic fibers are arranged in the transverse direction to form the planar array 9. This planar array 9 is positioned at right angles to the rectangular shape of exciting light 4 so that the photostimulated fluorescence 6 is wavelength shifted by each of the fluorescent plastic fibers 8. After the wavelength shift, the resulting fluorescence 12 is passed through the bandpass optical filter 10 which uses the wavelength of that fluorescence as a center wavelength, thereby rejecting the adverse effect of the scattered component of the exciting light 3. Since the fluorescent center wavelength is 450 nm, the optical filter 10 should also have a center wavelength of 450 nm.

In Example 1, the array of fluorescent plastic fibers extend from the photostimulated fluorescence detecting portion to the optical filter. If desired, only the detecting portion may be composed of the fluorescent plastic fiber array, with glass optical fibers of good propagation characteristics being used in the subsequent section. This alternative case is particularly effective if the detecting portion and the signal processing unit are spaced by a great distance.

In Example 1, fluorescent plastic optical fibers are used as the wavelength shifters. This is not the sole case of the invention and fluorescent glass optical fibers may be substituted. The wavelength shifters used in Example 1 are circular in shape but square or rectangular shifters would provide a higher detection efficiency. Another way to increase the detection efficiency is by stacking two or more layers of wavelength shifters in fiber form.

The wavelength shifted fluorescence 12 is thereafter detected with the photodetector 11 capable of detection in multiple channels.

EXAMPLE 2

The heretofore employed method of detecting fluorescence with a photomultiplier tube is described below on the basis of FIG. 3. The fluorescence 20 that has been wavelength shifted by fluorescent plastic fibers 21 is passed through an optical filter 22 and detected with a photomultiplier tube 23, where it is multiplied by a factor of about 100,000 and whence supplied into a signal amplifier 24 having a variable amplification factor in which the signal is amplified by an additional factor of about 10. These factors of amplification are variable with the range of intensity of the photo-stimulated fluorescence 6 to be detected. The amplified signal is integrated by an integrator 25 at the subsequent stage for 50 µs as long as a pixel in the imaging plate 5 is illuminated with the exciting light 3. The peak value of the integrated signal is digitized by an analog/digital converter 26 at the subsequent stage. The integrator 25 is thereafter reset by a reset signal 27 and starts integrating the signal from the next pixel. The digitized value is proportional to the quantity of the photostimulated fluorescence 6 emitted from the imaging plate 5 and, hence, to the quantity of the radiation applied to the pixel in the imaging plate being read. The number of circuits used to perform the signal processing under discussion is 400, which is equal to the number of the fluorescent optical fibers 21 used to detect the wavelength shifted fluorescence 20. The digitized signals are subjected to data processing with a signal processor 28 and stored in a storage unit 29 as digital data for reconstructing a two-dimensional radiation image. Fluorescence is detected pixel by pixel with the photomultiplier tube 23, integrated and subjected to real-time analog-to-digital conversion. Therefore, the time required for fluorescence detection and integration multiplied by the number of pixels to be scanned in the subsequent signal processing time is the duration of time required by a single scan, which is 20.4 ms in the case of Example 1.

This method of fluorescence and signal processing requires that as many photomultiplier tubes and signal processing circuits as the fluorescent plastic optical fibers should be fabricated, with the additional need to match the respective factors of amplification. This results in a bulky system which requires very cumbersome adjustments.

EXAMPLE 3

To deal with this difficulty, the present inventors have developed a multi-channel photodetector comprising optics, a streak tube and a CCD (charge-coupled device) camera. An example using this multi-channel photodetector is described below with reference to FIG. 4. The performance of the streak tube 31 has to be determined in accordance with the number of pixels in the imaging plate 5 to be scanned. In Example 3, the required number of pixels is 400 on each of the horizontal and vertical axes; hence, a streak tube of Model C2380 manufactured by Hamamatsu Photonics Co., Ltd. can be used in combination with a CCD camera capable of detecting 640×480 pixels. Another criterion for selection is detection sensitivity to the incident wavelength and the streak camera 31 shows a maximum sensitivity at 450 nm. With a lens being used as optics 42, the fluorescence emerging from a fluorescent plastic optical fiber array 34 is passed through a bandpass optical filter 10 having the wavelength of said fluorescence as a center wavelength and launched into the horizontal axis of the entrance window of the streak tube 31. The array 34 consists of fluorescent plastic optical fibers 35 that are progressively reduced in diameter from 0.5 mm to 0.1 mm and which are arranged in plane. A sweep signal 36 sent from a fine adjusting mechanism 17 is applied to the deflector 37 in the streak tube and the vertical axis of the streak tube 31 which sweeps by time is swept at time intervals of 50 µs that correspond to the reading position in the longitudinal direction of the imaging plate 5; as a result, a streak image consisting of 400 pixels on each of the horizontal and vertical axes is produced on the fluorescent screen 38 of the streak tube 31. This streak image is detected and accumulated with a CCD camera 32. The big advantage of using the streak tube is that on account of its accumulating action, the quantity of fluorescence is integrated simultaneously with its detection. The time required by the CCD camera 32 to read fluorescence for each pixel corresponds to the time for which one pixel is illuminated with the exciting light; hence, the time required for a single scan is equal to that time multiplied by the number of pixels to be scanned and calculated as 20 ms. The signals stored in the CCD camera 32 are subjected to analog-to-digital conversion in a frame memory 39, reconstructed as a two-dimensional radiation image in a signal processor 40, and stored in a storage unit 41. When the signals accumulated in the CCD camera 32 are picked up as digital signals by the signal processor 40 after passage through the frame memory 39, the analog-to-digital conversion time per pixel multiplied by the number of pixels in the CCD camera 32 is equal to the time required to pick up the signals. Given the conversion performance of 1 MHz, analog-to-digital conversion takes 1 µs per pixel; since all pixels in the CCD camera 32 need be read, the total signal processing time is about 30 ms. Therefore, if the imaging plate 5 measuring 20 cm×20 cm is scanned at a positional resolution of 0.5 mm and in the case of reading the radiation image signals from all pixels, the reading time is 50 ms which is the sum of the scanning time (20 ms) and the signal processing time (30 ms).

If an imaging plate of a greater size is to be read or if the positional resolution is to be enhanced by reducing the pixel size, a parallel array of multi-channel photodetectors each comprising optics, a streak tube and a CCD camera may be used to detect the imaging plate over areas that are divided either positionally or temporally or both positionally and temporally. In Example 3, a CCD camera is use to detect the streak image but this may be replaced by another imaging device such as an SIT camera.

EXAMPLE 4

To detect photostimulated fluorescence, optical fibers may be used in combination with a multi-channel photodetector comprising optics, a streak tube and a CCD camera. An example of this case is described below with reference to FIG. 5. As in the foregoing examples, a rectangular shape of exciting light 51 is produced by an illumination mechanism 54 using an exciting light source 52 and an optical fiber array 53 for guiding the light from the exciting light source. The front side of an imaging plate 5 is illuminated with the rectangular shape of exciting light 51 and a rectangular shape of photostimulated fluorescence 55 emitted from the same side is launched into an end of a detecting optical fiber array 57 and condensed. The array 57 consists of photo-stimulated fluorescence detecting optical fibers 56 that are arranged side by side and which are glass optical fibers having a diameter of 0.5 mm equivalent to the positional resolution across the transverse width of the imaging plate 5. Both optical fiber arrays 53 and 57 are mounted in the moving part 58 of a scan mechanism 59 and the angle at which the imaging plate 5 is illuminated with the rectangular shape of exciting light 51 from the fiber array 53 and the angle at which the photostimulated fluorescence 55 emitted from the imaging plate 5 is launched into the fiber array 57 are adjusted to ensure efficient detection of the photostimulated fluorescence 55 while reducing the effect of the scattered component of the exciting light 51 which can be background noise to the two-dimensional radiation image being reconstructed. The moving part 58 is mechanically operated at 1 m/s. Therefore, the time required to scan the longitudinal width (20 cm) of the imaging plate 5 is 200 ms and the reading time for each pixel is 0.5 ms. Hence, a power of 1 W suffices for the exciting light source 52. The photostimulated fluorescence 55 emerging from the optical fiber array 57 is passed through a bandpass optical filter 60 having the wavelength of the photostimulated fluorescence as a center wavelength, thereby attenuating the effect of the scattered component of the exciting light 51. In Example 4, the wavelength of the photostimulated fluorescence 55 is 390 nm, so the optical filter 60 should have a center wavelength of 390 nm. After passing through the optical filter 60, the photostimulated fluorescence 55 is passed through optics 69 and launched into a multi-channel photodetector comprising the combination of a streak tube 61 and a CCD camera 62. As in Example 3, a streak tube of Model C2830 manufactured by Hamamatsu Photonics Co., Ltd. may be combined with a CCD camera capable of detecting 640×480 pixels. The photostimulated fluorescence 55 passing through the optics 69 (a lens) and the optical filter 60 is launched into the horizontal axis of the entrance window of the streak tube 61. In addition, a sweep signal 64 sent from the scan mechanism 59 is applied to a deflector 65 in the streak tube and the vertical axis of the streak tube 61 which sweeps by time is swept at time intervals of 0.5 ms that correspond to the reading position in the longitudinal direction of the imaging plate 5; as a result, a streak image consisting of 400 pixels on each of the horizontal and vertical axes is produced on the fluorescent screen 63 of the streak tube 61. The streak image is cumulatively detected with the CCD camera 62; the accumulated signals are read and digitized with a frame memory 66, reconstructed as a two-dimensional image by means of a signal processor 67 and stored in a storage unit 68.

Thus, radiation image signals can be read from the imaging plate at a faster speed than in the conventional method, allowing for continuous reading of the two-dimensional radiation image from the imaging plate as it is illuminated with radiation.

EXAMPLE 5

In accordance with the invention, the photomultiplier tube described in Example 2 may be used in multiple units to make up a multi-channel photodetector. An example of this case is described below with reference to FIG. 6. A rectangular shape of exciting light 4 is continuously and repetitively scanned over the imaging plate 5 from the start to the end point of its longitudinal width. As already mentioned, the time required for a single scan is 20.4 ms. In synchronism with this scan operation, a sync signal 71 generated from a fine adjusting mechanism 17 is input to a signal processor 13 so that the scan operation synchronizes with the process comprising the steps of amplifying the detection signals from a multi-channel photodetector 11, integrating them, digitizing the integrated signals, using them to reconstruct a two-dimensional radiation image and storing it in a storage unit 14, whereby the two-dimensional radiation image can be continuously read from the imaging plate as it is illuminated with radiation. The time of detection on the imaging plate is equal to the time required by the rectangular shape of exciting light to return to the initial reading position after a sequence of scan steps ends. In the case of Example 5, this is 20.4 ms.

EXAMPLE 6

A plurality of CCD cameras may be combined with optics and a streak camera to fabricate a multi-channel photodetector. An example of the case of using such multi-channel photodetector for continuously reading a two-dimensional radiation image from an imaging plate as it is illuminated with radiation is described below with reference to FIG. 7. The required number of CCD cameras can be calculated in the following manner: the signal processing time (i.e., for reading the radiation image data) is divided by the time required for a single scan and, if there is any surplus, the quotient is raised to a unit and "1" is added to the unit. In Example 6, the time required by a CCD camera to pick up fluorescence for each pixel corresponds to the time over which one pixel is illuminated with exciting light and multiplying this time by the number of pixels to be scanned gives the time required for a single scan, which is 20 ms. On the other hand, the signal processing time for reading the radiation image data already accumulated in the CCD camera is 30 ms if the reading speed is 1 MHz (see Example 3). Therefore, the required number of CCD cameras can be calculated as three.

When a rectangular shape of exciting light 4 is continuously and repetitively scanned over the imaging plate 5 from the start point in the longitudinal direction to the end point of the longitudinal width, the streak image produced on the fluorescent screen 38 of the streak tube 31 by a single scan is detected and accumulated in three CCD cameras 83, 84 and 85 which are selectively operated in synchronism with the scan of the imaging plate. Selective operation of the CCD cameras is achieved with a CCD camera switching mechanism 86 that is activated in response to a sync signal issued from a mechanism 17 for fine adjustment of a mirror 16. While the streak image is cumulatively detected with one CCD camera 83, the radiation image data already accumulated in the other CCD cameras 84 and 85 is successively read by a signal processor 90 and stored in a storage unit 91. This eliminates the need to suspend the scan operation when the radiation image data accumulated in the CCD cameras is read via frame memories 85, 86 and 87 and the two-dimensional radiation image can be continuously read from the imaging plate as it is illuminated with radiation.

EXAMPLE 7

In Example 6, the streak image produced on the fluorescent screen of the streak tube by a single scan is cumulatively detected with two or more CCD cameras that are selectively operated in synchronism with the scan of the imaging plate. An exemplary method of selectively operating the CCD cameras is described below with reference to FIG. 8. In the case under consideration, three CCD cameras 103, 104 and 105 are mounted at equal angles of 120 degrees on a rotating table 101. The rotating table 101 is rotated by a drive mechanism 102 until one CCD camera comes into registry with the streak image on the fluorescent screen of the streak tube 31. When one scan of the imaging plate with exciting light ends, the rotating table 101 is turned to set the next CCD camera in registry with the streak image. This procedure is repeated for the three CCD cameras. In response to a sync signal 109 sent out from the fine adjustment mechanism 17 which controls the mirror 16, the table 101 rotates in synchronism with the timing of returning the rectangular shape of exciting light 4 from the scan end point of the imaging plate 5 to the start point. Since the signals for the data stored in the CCD cameras have to be processed in the order they were detected and accumulated by the CCD cameras, the table 101 rotates in a given direction at a constant speed and, hence, each CCD camera takes a constant time to come into registry with the streak image. Synchronization can readily be achieved by adjusting this constant time to be equal to the time required by the rectangular shape of exciting light 4 to return from the end point in the longitudinal width of the imaging plate to the start point after it has been subjected to one scan cycle. While the streak image on the fluorescent screen of the streak tube 31 is being cumulatively detected with the CCD camera 103 set in registry with that streak image, the signal processor 40 successively reads radiation image data from the two other CCD cameras 104 and 105 that have already accumulated the streak image and the picked up signals are accordingly stored in the storage unit 41. This eliminates the need to suspend the scan operation when the radiation image data accumulated in the CCD cameras is read via frame memories 106, 107 and 108 and the two-dimensional radiation image can be continuously read from the imaging plate as it is illuminated with radiation. In the case of using two CCD cameras, they may be selectively operated by alternating movements in a linear path. If desired, a mirror or other optical devices may be used to perform selective operation of the two CCD cameras.

EXAMPLE 8

The invention also encompasses the use of an imaging plate made from a new material, or one having a planar array of optical fibers made of a glass capable of emitting photostimulated fluorescence. An example of this exotic imaging plate is shown in FIG. 9. An exemplary glass that can be used is the light accumulating glass manufactured by Sumida Glass Co., Ltd. which, after exposure to X-rays, is illuminated with exciting light at 800–1,000 nm to emit green photostimulated fluorescence. This light accumulating glass is worked into optical fibers 121 that are 20 cm long and 0.5 mm in diameter and which are capable of emitting photostimulated fluorescence. Four hundred of such optical fibers are arranged in a plane and fixed on a plastic base sheet 122 by means of a highly transparent adhesive 123 to fabricate a glass imaging plate 124 that measures 20 cm×20 cm and whose positional resolution across the transverse width is equivalent to the diameter (0.5 mm) of each optical fiber. The end faces of the optical fibers from which photostimulated fluorescence is to be read are polished optically and the other end faces are made lightproof.

EXAMPLE 9

An example of the apparatus and method for reading a radiation image from the glass imaging plate fabricated in Example 8 and which is capable of emitting photostimulated fluorescence is described below with reference to FIG. 10. In FIG. 10, reference numeral 131 designates an exciting light source generating a wavelength of light that is capable of exciting a stimulable phosphor, 132 designates semiconductor lasers, 133 is an illumination and scan mechanism by which the exciting light 134 outputted from the source 131 is applied in a rectangular shape in the signal reading position on an imaging plate, 135 is the rectangular shape of exciting light, 136 is the imaging plate made of a glass capable of emitting photostimulated fluorescence, 137 is photostimulated fluorescence, 138 is a glass optical fiber, 139 is a bandpass optical filter having the wavelength of the photostimulated fluorescence as a center frequency, 140 is a photodetector with which the photostimulated fluorescence 137 emerging from the optical filter 139 can be detected through multiple channels, 141 is a signal processor with which the detection signals for the multiple channels are processed and digitized to be reconstructed as a radiation image, and 142 is a storage unit for storing the reconstructed radiation image. The illumination an d scan mechanism 133 is composed of an optical fiber array 143 for guiding the exciting light from the source 1, a mirror 144 and a mechanism 145 for fine adjustment of the mirror.

As in the foregoing examples, the method of the invention for reading radiation images from the imaging plate 136 is characterized in that when photostimulated fluorescence 137 that is emitted upon illumination with exciting light 134 of the color centers created in the bulk of the glass capable of emitting photostimulated fluorescence (i.e., the detection medium in the imaging plate 136) upon exposure to radiation are to be read as radiation signals, the exciting light is applied in the rectangular form 135 one side of which is equal to or longer than the transverse width of the imaging plate 136 and the other side of which is comparable in length to the reading positional resolution in the longitudinal direction of the imaging plate 136.

Let us first describe the illumination and scan mechanism 133 for creating the rectangular shape of exciting light 135 and applying it to the imaging plate 136. The exciting light 134 is produced by the source 131 which is a laser in this example. Compared to the conventional pixel-by-pixel reading, the power of the laser which is required to produce a rectangular shape of exciting light has to be increased in accordance with the number of pixels that are read at a time. If the imaging plate 136 measuring 20 cm×20 cm is to be read at a positional resolution of 0.5 mm, 400 pixels are read in both vertical and horizontal directions. Considering reading within a short time, at least 5 W is required if 400 pixels are to be read at a time. The wavelength of the exciting light should be capable of exciting the photostimulated fluorescence 137 from the glass capable of emitting photostimulated fluorescence which is used as the detection medium in the imaging plate 136. The stimulable phosphor in the imaging plate 136 can be excited in a wavelength band from 800 nm to 1,000 nm. Therefore, the semiconductor lasers 132 should be those which emit laser light at a wavelength of 840 nm.

Since the maximum output power of the semiconductor lasers 132 is only 100 mW, a total of 50 units of them are used in this example. The fiber array 143 therefore consists of 50 optical fibers which have circular cross sections at an end and which are combined at the other end in a rectangular shape. The light from the semiconductor lasers is launched into the circular ends of the respective fibers and allowed to exit from the other end to produce a rectangular shape of exciting light 135. Using the illumination and scan mechanism 133, this rectangular shape of exciting light is applied to the front side of the imaging plate 136 and scanned along the glass optical fibers 146 in the plate. The photostimulated fluorescence 137 emitted from the individual glass optical fibers 146 is picked up from an array of glass optical fibers 138 each having a diameter of 0.5 mm that are coupled to the glass optical fibers 138. The picked up fluorescence 137 is passed through a bandpass optical filter 139 having the wavelength of the fluorescence as a center wavelength and thereafter launched into the photodetector 140 capable of detection in multiple channels. The detection signals from the multiple channels are read and digitized with the signal processor 141 and the digital signals are reconstructed as a two-dimensional radiation image, which is stored in the storage unit 142. The multi-channel photodetector 140 is typically the detector used in the example shown in FIG. 2.

In the foregoing description, the radiations to be measured are limited to ionizing radiations such as X-rays, γ-rays, β-rays, α-rays and particle rays that can be directly measured with the imaging plate. An imaging plate capable of detecting neutrons is also included within the scope of the invention and a neutron imaging plate of the BAS series manufactured by Fuji Photo Film Co., Ltd. and available under the trade name BAS-ND may be used; this imaging plate uses Gd as a neutron converter that can convert neutrons to an ionizable radiation. The back side of the commercial neutron imaging plate is not transparent but can be easily rendered transparent. By continuously scanning this neutron imaging plate with the rectangular shape of exciting light, two-dimensional neutron images can be continuously read from the imaging plate as it is illuminated with neutrons.

By using the multi-channel photodetector comprising optics, a streak tube and a CCD camera, the radiation image recorded two-dimensionally in an imaging plate can be read with a simple system at high speed irrespective of whether wavelength shifters are used for detection or optical fibers are used for light condensing purposes. Advantages of the Invention Having the design features described above, the present invention offers the following advantages.

If the imaging plate is illuminated with a rectangular shape of exciting light, photostimulated fluorescence is emitted in a rectangular shape from the back side of the imaging plate; by detecting the emitted fluorescence with a planar array of wavelength shifters, the radiation image recorded two-dimensionally in the imaging plate can be read easily and at high speed.

The only mechanical part of the scan unit is found in the mechanism for scanning the imaging plate by illuminating it with the rectangular shape of exciting light and this contributes to reduce the possible causes of trouble.

The imaging plate used in the invention is capable of transmitting light through both front and back sides and exciting light is incident on the front side whereas the photostimulated fluorescence being emitted from the back side is detected with the array of wavelength shifters. Combined with the use of two bandpass optical filters for the photostimulated fluorescence and the wavelength-shifted fluorescence, the above described method ensures that the scattered exciting light will not be launched into the photodetector to become background noise to the radiation image being reconstructed.

An imaging plate using a planar array of optical fibers made of a glass capable of emitting photostimulated fluorescence allows for highly sensitive and rapid reading of the radiation image.

By using a multi-channel photodetector comprising optics, a streak tube and a CCD camera, the radiation image recorded two-dimensionally in the imaging plate can be read with a simple system at high speed irrespective of whether wavelength shifters are used for detection or optical fibers are used for light condensing purposes.

Since high-speed reading of radiation image signals from the imaging plate is possible, the step of scanning with the rectangular shape of exciting light may be synchronized with the process comprising the steps of cumulatively detecting the radiation image signals from the imaging plate, digitizing them and storing the digital signals in a signal processor, thereby enabling the two-dimensional radiation image to be read continuously from the imaging plate as it is illuminated with radiation.

If two or more CCD cameras are selectively operated in synchronism with the scan of the imaging plate, there is no need to suspend the scanning operation and a two-dimensional radiation image can be continuously read from the imaging plate as it is illuminated with radiation.

If desired, at least one neutron converter selected from among Gd, $^6$Li and $^{10}$B which can convert neutrons to an ionizable radiation may be incorporated in the imaging plate and mixed or combined with the stimulable phosphor used as a radiation detecting medium and the resulting imaging plate is suitable for detecting neutrons. Two-dimensional neutron images can be continuously read from this imaging plate as it is illuminated with neutrons.

What is claimed is:

1. An apparatus for reading a radiation image from an imaging plate, comprising:

an exciting light source generating a wavelength of light that is capable of exciting a stimulable phosphor;

an illumination and scan mechanism by which the exciting light outputted from the source is applied in a rectangular shape to an imaging plate for scanning purposes;

an imaging plate that is adapted to transmit light through both the front and back sides and which uses a stimulable phosphor as a detection medium;

a bandpass optical filter having the wavelength of the photostimulated fluorescence as a center wavelength;

a planar array of wavelength shifters in fiber form that can be excited by photostimulated fluorescence;

a bandpass optical filter which uses as a center wavelength the wavelength of fluorescence that has been shifted in wavelength by the wavelength shifters;

a photodetector with which the fluorescence emitted after wavelength shift by the respective wavelength shifters can be detected through multiple channels; and a signal processor with which the detection signals for the multiple channels are processed, digitized and reconstructed as a radiation image.

2. A method of reading a radiation image from an imaging plate by illuminating its front side with the exciting light from an exciting light source using an illumination and scan mechanism, comprising the steps of:

scanning the imaging plate with a rectangular shape of exciting light that is moved in the longitudinal direction of the imaging plate and one side of which is equal to or longer than the transverse width of the imaging plate and the other side of which is comparable in length to the reading positional resolution in the longitudinal direction of the imaging plate;

causing the photostimulated fluorescence from the back side of the imaging plate to pass through a bandpass optical filter that is positioned under the back side of the imaging plate and which uses the wavelength of the photostimulated fluorescence as a center wavelength;

thereafter directing the photostimulated fluorescence into an array of wavelength shifters in fiber form that is positioned at right angles to the rectangular shape of exciting light, said shifters having a width comparable to the reading positional resolution in the transverse direction of the imaging plate and a length equal to or greater than the longitudinal width of the imaging plate;

shifting the wavelength of the photostimulated fluorescence by the respective wavelength shifters;

passing the photostimulated fluorescence through a bandpass optical filter having the wavelength of the wavelength-shifted fluorescence as a center wavelength;

thereafter detecting the fluorescence with a photodetector capable of detection through multiple channels; and processing and digitizing the detection signals from the multiple channels with a signal processor and reconstructing the digital signals as a radiation image.

3. The apparatus according to claim 1, wherein the photodetector capable of detection through multiple channels comprises optics, a streak tube and a CCD (charge-coupled device) camera.

4. The method according to claim 2, wherein the photodetector capable of detection through multiple channels comprises optics, a streak tube and a CCD (charge-coupled device) camera and wherein the fluorescence passing through the bandpass optical filter having the wavelength of the wavelength-shifted fluorescence as a center wavelength is passed through the optics and launched into the horizontal axis of the streak tube whereas the vertical axis of the streak tube which sweeps by time is swept in registry with the position on the imaging plate where it is scanned with the rectangular shape of exciting light by means of the illumination and scan mechanism, and the streak image on the fluorescent screen of the streak tube is cumulatively detected with the CCD camera and the accumulated signals are read and digitized with the signal processor to be constructed as a radiation image.

5. An apparatus for reading a radiation image from an imaging plate, comprising:

an exciting light source generating a wavelength of light that is capable of exciting a stimulable phosphor;

an illumination mechanism by which the exciting light outputted from the source is applied in a rectangular shape to an imaging plate;

an imaging plate using the stimulable phosphor as a detection medium;

a single array of optical fibers into which the photostimulated fluorescence emitted upon illumination with the exciting light is launched from an end to be condensed;

a scan mechanism comprising a moving section for moving both the output section of the illumination mechanism which issues the rectangular shape of exciting light and the array of optical fibers and a drive section for driving said moving section;

a bandpass optical filter having the wavelength of the photostimulated fluorescence as a center wavelength;

a multi-channel photodetector for detecting the photostimulated fluorescence from the array of optical fibers in multiple channels and which comprises optics, a streak tube and a CCD camera in combination; and a signal processor for processing the detection signals from the multiple channels.

6. A method for reading a radiation image from an imaging plate using the apparatus recited in claim 5, wherein a rectangular shape of exciting light, one side of which is equal to or longer than the transverse width of the imaging plate and the other side of which is comparable in length to the reading positional resolution in the longitudinal direction of the imaging plate, is issued from the output section of the illumination mechanism on the moving section of the scan mechanism to illuminate the front side of the imaging plate, the photostimulated fluorescence emitted in a rectangular shape is condensed by the single array of optical fibers in the moving section of the scan mechanism, passed through the bandpass optical filter having the wavelength of the photostimulated fluorescence as a center wavelength, then passed through the optics, and launched into the horizontal axis of the streak tube whereas the vertical axis of the streak tube which sweeps by time is swept in registry with the position on the imaging plate where it is scanned with the rectangular shape of exciting light by the scan mechanism, and the streak image on the fluorescent screen of the streak tube is cumulatively detected with the CCD camera, with the accumulated signals being read and digitized with the signal processor and reconstructed as a radiation image.

7. The method according to claim 2, wherein the step of scanning the imaging plate continuously and repetitively with the rectangular shape of exciting light from the start to the end point across the longitudinal width of the imaging plate is synchronized with the process comprising the steps of cumulatively detecting the radiation image signals from the imaging plate, processing the signals, digitizing them and storing the digital signals in the storage unit in the signal processor, thereby enabling the radiation image to be read continuously from the imaging plate as it is illuminated with radiation.

8. The apparatus according to claim 3 or 5, which uses two or more CCD cameras to detect and accumulate the streak image obtained on the fluorescent screen of the streak tube and those CCD cameras are selectively operated in synchronism with the step of scanning the imaging plate continuously and repetitively with the rectangular shape of exciting light from the start to the end point across the longitudinal width of the imaging plate, thereby enabling the radiation image to be read continuously from the imaging plate as it is illuminated with radiation.

9. The method according to claim 4 or 6, wherein when the imaging plate is scanned continuously and repetitively with the rectangular shape of exciting light from the start to the end point across the longitudinal width of the imaging plate, the streak image on the fluorescent screen of the streak tube is cumulatively detected with two or more CCD cameras that are selectively operated in synchronism with the scan of the imaging plate and while one CCD camera is in the process of detecting and accumulating the streak image, the radiation image data accumulated in the other CCD cameras is read, whereby the radiation image is continuously read from the imaging plate as it is illuminated with radiation without suspending the scanning operation for the period of time required to read the radiation image data accumulated in all CCD cameras.

10. The apparatus according to claim 8, wherein two or more CCD cameras provided at equal angles on a rotating table are moved in synchronism with the repetitive scan of the imaging plate with the rectangular shape of exciting light until one of them comes into registry with the streak image on the fluorescent screen of the streak tube, said one CCD camera being then operated to detect and accumulate the streak image while the radiation image data already accumulated in the other CCD cameras is read, whereby the radiation image is continuously read from the imaging plate as it is illuminated with radiation without suspending the scanning operation for the period of time required to read the radiation image data accumulated in all CCD cameras.

11. The apparatus according to claim 10, which uses an imaging plate especially adapted for neutron detection, in which at least one neutron converter selected from among Gd, $^6$Li and $^{10}$B which can convert neutrons to an ionizable radiation is mixed or combined with the stimulable phosphor, whereby a two-dimensional neutron image is continuously read from the neutron imaging plate either off-line or as it is illuminated with neutrons.

12. An imaging plate having a planar array of optical fibers made of a transparent glass capable of emitting photostimulated fluorescence, which reconstructs a radiation image by reading as radiation signals the photostimulated fluorescence emitted upon illumination with exciting light of the color centers created in the bulk of said glass by radiation.

13. An apparatus for reading a radiation image from an imaging plate, comprising:

an imaging plate composed of the optical fibers according to claim 12 which are made of a glass capable of emitting photostimulated fluorescence;

an exciting light source generating a wavelength of light that is capable of exciting the glass which is capable of emitting photostimulated fluorescence;

an illumination and scan mechanism by which the exciting light outputted from the source is applied in a rectangular shape to the imaging plate for scanning purposes;

an array of optical fibers;

a bandpass optical filter having the wavelength of the photostimulated fluorescence as a center wavelength;

a photodetector with which the photostimulated fluorescence emitted from the optical filter can be detected through multiple channels; and a signal processor with which the detection signals for the multiple channels are processed, digitized and reconstructed as a radiation image.

14. The apparatus according to claim 13, wherein the photodetector capable of detection through multiple channels comprises optics, a streak tube and a CCD (charge-coupled device) camera.

15. A method of reading a radiation image from the imaging plate according to claim 12 by illuminating it with the exciting light from an exciting light source using an illumination and scan mechanism, comprising the steps of:

scanning the imaging plate with a rectangular shape of exciting light that is moved along the optical fibers of which the imaging plate is composed and one side of which is equal to or longer than the transverse width of the imaging plate and the other side of which is comparable in length to the reading positional resolution in the longitudinal direction of the imaging plate;

picking up through optical fibers the photostimulated fluorescence being emitted from the individual optical fibers of which the imaging plate is composed;

causing the picked-up photostimulated fluorescence to pass through a bandpass optical filter which uses the wavelength of the photostimulated fluorescence as a center wavelength;

thereafter detecting the fluorescence with a photodetector capable of detection through multiple channels; and processing and digitizing the detection signals from the multiple channels with a signal processor and reconstructing the digital signals as a radiation image.

16. The method according to claim 14, wherein the photodetector capable of detection through multiple channels comprises optics, a streak tube and a CCD (charge-coupled device) camera and wherein the fluorescence passing through the bandpass optical filter having the wavelength of the fluorescence as a center wavelength is passed through the optics and launched into the horizontal axis of the streak tube whereas the vertical axis of the streak tube which sweeps by time is swept in registry with the position on the imaging plate where it is scanned with the rectangular shape of exciting light by means of the illumination and scan mechanism, and the streak image on the fluorescent screen of the streak tube is cumulatively detected with the CCD camera and the accumulated signals are read and digitized with the signal processor to be constructed as a radiation image.

17. An apparatus for reading a radiation image from an imaging plate, comprising:

an exciting light source generating a wavelength of light that is capable of exciting a stimulable phosphor;

an illumination mechanism by which the exciting light outputted from the source is applied in a rectangular shape to an imaging plate;

an imaging plate using the stimulable phosphor as a detection medium;

a single array of optical fibers into which the photostimulated fluorescence emitted upon illumination with the exciting light is launched from an end to be condensed;

a scan mechanism comprising a moving section for moving both the output section of the illumination mechanism which issues the rectangular shape of exciting light and the array of optical fibers and a drive section for driving said moving section;

a bandpass optical filter having the wavelength of the photostimulated fluorescence as a center wavelength;

a multi-channel photodetector for detecting the photostimulated fluorescence from the array of optical fibers in multiple channels and which comprises optics, a streak tube and a CCD camera in combination; and a signal processor for processing the detection signals from the multiple channels.

18. A method for reading a radiation image from an imaging plate using the apparatus recited in claim 17, wherein a rectangular shape of exciting light, one side of which is equal to or longer than the transverse width of the imaging plate and the other side of which is comparable in length to the reading positional resolution in the longitudinal direction of the imaging plate, is issued from the output section of the illumination mechanism on the moving section of the scan mechanism to illuminate the front side of the imaging plate, the photostimulated fluorescence emitted in a rectangular shape is condensed by the single array of optical fibers in the moving section of the scan mechanism, passed through the bandpass optical filter having the wavelength of the photostimulated fluorescence as a center wavelength, then passed through the optics, and launched into the horizontal axis of the streak tube whereas the vertical axis of the streak tube which sweeps by time is swept in registry with the position on the imaging plate where it is scanned with the rectangular shape of exciting light by the scan mechanism, and the streak image on the fluorescent screen of the streak tube is cumulatively detected with the CCD camera, with the accumulated signals being read and digitized with the signal processor and reconstructed as a radiation image.

19. The method according to claim 18, wherein when the imaging plate is scanned continuously and repetitively with the rectangular shape of exciting light from the start to the end point across the longitudinal width of the imaging plate, the streak image on the fluorescent screen of the streak tube is cumulatively detected with two or more CCD cameras that are selectively operated in synchronism with the scan of the imaging plate and while one CCD camera is in the process of detecting and accumulating the streak image, the radiation image data accumulated in the other CCD cameras is read, whereby the radiation image is continuously read from the imaging plate as it is illuminated with radiation without suspending the scanning operation for the period of time required to read the radiation image data already accumulated in all CCD cameras.

20. The apparatus according to claim 17, wherein the step of scanning the imaging plate continuously and repetitively with the rectangular shape of exciting light from the start to the end point across the longitudinal width of the imaging plate is synchronized with the process comprising the steps of cumulatively detecting the radiation image signals from the imaging plate, processing the signals, digitizing them and storing the digital signals in the storage unit in the signal processor, thereby enabling the radiation image to be read continuously from the imaging plate as it is illuminated with radiation.

21. The apparatus according to claim 17, which uses two or more CCD cameras to detect and accumulate the streak image obtained on the fluorescent screen of the streak tube and those CCD cameras are selectively operated in synchronism with the step of scanning the imaging plate continuously and repetitively with the rectangular shape of exciting light from the start to the end point across the longitudinal width of the imaging plate, thereby enabling the radiation image to be read continuously from the imaging plate as it is illuminated with radiation.

22. The apparatus according to claim 20, wherein two or more CCD cameras provided at equal angles on a rotating table are moved in synchronism with the repetitive scan of the imaging plate with the rectangular shape of exciting light until one of them comes into registry with the streak image on the fluorescent screen of the streak tube, said one CCD being then operated to detect and accumulate the streak image while the radiation image data already accumulated in the other CCD cameras is read, whereby the radiation image is continuously read from the imaging plate as it is illuminated with radiation without suspending the scanning operation for the period of time required to read the radiation image data accumulated in all CCD cameras.

23. The apparatus according to claim 22, which uses an imaging plate especially adapted for neutron detection in which at least neutron converter selected from among Gd, $^6$Li and $^{10}$B which can convert neutrons to an ionizable radiation is mixed or combined with the stimulable phosphor, whereby a two-dimensional neutron image is continuously read from the neutron imaging plate either off-line or as it is illuminated with neutrons.

* * * * *